(12) United States Patent
Aoki et al.

(10) Patent No.: US 6,266,688 B1
(45) Date of Patent: Jul. 24, 2001

(54) SCHEME FOR ARITHMETIC OPERATIONS IN FINITE FIELD AND GROUP OPERATIONS OVER ELLIPTIC CURVES REALIZING IMPROVED COMPUTATIONAL SPEED

(75) Inventors: Kazmaro Aoki, Yokohama; Kazuo Ohta, Zushi, both of (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/638,322

(22) Filed: Aug. 14, 2000

Related U.S. Application Data

(62) Division of application No. 09/484,896, filed on Jan. 18, 2000, which is a division of application No. 09/014,891, filed on Jan. 28, 1998, now Pat. No. 6,038,581.

(30) Foreign Application Priority Data

| Jan. 29, 1997 | (JP) | ......................................... | 9-15739 |
| Jul. 31, 1997 | (JP) | ......................................... | 9-206992 |
| Jul. 31, 1997 | (JP) | ......................................... | 9-206995 |

(51) Int. Cl.⁷ ........................................................ G06F 7/00
(52) U.S. Cl. ............................................................. 708/492
(58) Field of Search .................................. 708/491–492; 714/752, 758; 380/28; 326/8

(56) References Cited

U.S. PATENT DOCUMENTS

| 5,414,719 | * | 5/1995 | Iwaki et al. | ......................... | 708/492 |
| 5,602,767 | * | 2/1997 | Fettweis et al. | ..................... | 708/492 |
| 5,689,452 | * | 11/1997 | Cameron | .............................. | 708/492 |
| 5,812,438 | * | 9/1998 | Lan et al. | ............................. | 708/492 |
| 5,964,826 | * | 10/1999 | Wei | ...................................... | 708/492 |
| 6,044,389 | * | 3/2000 | Weng et al. | .......................... | 708/492 |
| 6,141,420 | * | 10/2000 | Vanstone et al. | ..................... | 708/492 |
| 6,141,786 | * | 10/2000 | Cox et al. | ............................ | 708/492 |

* cited by examiner

Primary Examiner—Tan V. Mai
(74) Attorney, Agent, or Firm—Kilpatrick Stockton LLP

(57) ABSTRACT

A scheme for arithmetic operations in finite field and group operations over elliptic curves capable of realizing a very fast implementation. According to this scheme, by using a normal basis $[\alpha \; \alpha+1]$, the multiplicative inverse calculation and the multiplication in the finite field $GF(2^{2n})$ can be realized as combinations of multiplications, additions and a multiplicative inverse calculation in the subfield $GF(2^n)$. Also, by using a standard basis $[1 \; \alpha]$, the multiplication, the square calculation, and the multiplicative inverse calculation in the finite field $GF(2^{2n})$ can be realized as combinations of multiplications, additions and a multiplicative inverse calculation in the subfield $GF(2^n)$. These arithmetic operations can be utilized for calculating rational expressions expressing group operations over elliptic curves that are used in information security techniques such as elliptic curve cryptosystems.

3 Claims, 21 Drawing Sheets

FIG. 14

| ARITHMETIC OPERATIONS IN $GF(2^{2n})$ | | REQUIRED NUMBER OF ARITHMETIC OPERATIONS IN $GF(2^n)$ | | | | |
|---|---|---|---|---|---|---|
| | | ADDITION | MULTIPLICATION | SQUARE | INVERSE | DEPTH |
| ADDITION | 2ND EMBODIMENT | 2 | | | | 1 |
| | 1ST EMBODIMENT | 2 | | | | 1 |
| MULTIPLICATION | 2ND EMBODIMENT | 4 | 4 | | | 3 |
| | 1ST EMBODIMENT | 4 | 4 | | | 4 |
| SQUARE | 2ND EMBODIMENT | 1 | 1 | 2 | | 3 |
| | 1ST EMBODIMENT | 3 | 1 | 2 | | 4 |
| INVERSE | 2ND EMBODIMENT | 2 | 4 | 1 | 1 | 5 |
| | 1ST EMBODIMENT | 2 | 4 | 1 | 1 | 6 |

SCHEME FOR ARITHMETIC OPERATIONS IN FINITE FIELD AND GROUP OPERATIONS OVER ELLIPTIC CURVES REALIZING IMPROVED COMPUTATIONAL SPEED

CROSS-REFERENCE TO RELATED APPLICATION

This is a divisional of U.S. application Ser. No. 09/484,896 filed Jan. 18, 2000, which in turn is a divisional of U.S. application Ser. No. 09/014,891 filed Jan. 28, 1998 and now U.S. Pat. No. 6,038,581.

BACKGROUND OF THE INVENTION

1. Field of the Invention

The present invention relates to a scheme for arithmetic operations in finite field and group operations over elliptic curves, and more particularly, to a computational scheme for arithmetic operations in finite fields such as $GF(2^m)$ which is to be utilized in realizing error correction coding (such as algebraic geometric coding) and information security technique (such as elliptic curve cryptosystem) including key distribution and authentication using group operations over elliptic curves.

2. Description of the Background Art

As a fast implementation of multiplicative inverse calculation in $GF(2^m)$, a scheme based on multiplication using a normal basis has been proposed by J. L. Massey and J. K. Omura (see U.S. Pat. No. 4,587,627). This scheme is based on the principle that, when the Fermat's little theorem over finite fields holds in a form of:

$x^{2^m-1}=1$ for an element x ($\neq 0$) of $GF(2^m)$ it is possible to calculate multiplicative inverse in a form of:

$x^{-1}=x^{2^m-2}$

Other schemes based on this same principle are also disclosed, for example, in Agnew et al.: "Arithmetic Operations in $GF(2^m)$", Journal of Cryptology, Vol. 6, pp. 3–13, 1993, and P. C. van Oorschot, S. A. Vanstone: "A Geometric Approach to Root Finding in $GF(q^m)$", IEEE Transactions of Information Theory, Vol. 35, No. 2, pp. 444–453, March 1989.

Either scheme utilizes the fact that multiplication in $GF(2^m)$ can be efficiently realized by hardware by using a normal basis, and realizes multiplicative inverse calculation in $GF(2^m)$ as a combination of multiplication and shift (including rotate) operations in $GF(2^m)$. In the presently known algorithm, it is known that multiplications in $GF(2^m)$ are required for $[\log_2 m]+\{$the number of 1 in the binary representation of $(m-1)\}-1$ times, bit shift operations are required for $(m-1)$ times, and when $GF(2^m)$ is a quadratic extension of $GF(2^{m/2})$, by the use of subfield in multiplicative inverse calculation in $GF(2^m)$, two multiplications in $GF(2^m)$ and one shift operation in $GF(2^{m/2})$ constitute one multiplicative inverse calculation in $GF(2^{m/2})$.

However, when this multiplication algorithm is straightforwardly implemented by software, there arises a problem of lowering of efficiency because of tedious bit unit handling.

For this reason, there is a known scheme for calculating multiplication in $GF(2^m)$ by using subfield (see A. Pincin: "A New Algorithm for Multiplication in Finite Fields", IEEE Transactions on Computers, Vol. 38, No. 7, pp. 1045–1049, July 1989, for example).

In the case of realizing finite field arithmetic by software, because of the looser constraint on memory size compared with the case of hardware implementation, the fast implementation becomes possible by providing a table of calculation results obtained by preliminary calculations and reading out necessary information from the table subsequently. A very fast algorithm utilizing this fact is disclosed in E. De Win et al.: "A Fast Software Implementation for Arithmetic Operations in $GF(2^n)$", Advances in Cryptology—ASIACRYPT'96, Lecture Notes in Computer Science 1163, pp. 65–76, Springer-Verlag, 1996, for example.

Now, many secret key cryptosystems improve their security by iterating F functions several times. It is known that the security can be guaranteed by utilizing exponential calculations in F function (see K. Nyberg: "Differentially Uniform Mappings for Cryptography", Advances in Cryptology—EUROCRYPT'93, Lecture Notes in Computer Science 765, pp. 55–64, Springer-Verlag, 1994, and K. Nyberg, L. R. Knudsen: "Provable Security Against a Differential Attack", Journal of Cryptology, Vol. 8, pp. 27–37, 1995). In these references, it is recommended to construct F function by using cube calculations or multiplicative inverse calculations.

However, when conventionally used input data are represented by using a normal basis on prime field $GF(2)$ and multiplicative inverse calculation in $GF(2^{2n})$ is straightforwardly implemented by software using the algorithm of van Oorschot et al., there arises a problem of lowering of efficiency because of tedious bit unit handling.

Now, elements of a group $E(K)$ of elliptic curves over a field K can be expressed in terms of either homogeneous coordinates formed by a set of three elements of K or affine coordinates formed by a set of two elements of K. Addition of $E(K)$ can be calculated by arithmetic operations over field K in ether expression using homogeneous coordinates or affine coordinates.

In constructing a device for realizing group operations over elliptic curves, a field K can be chosen be a finite field $GF(q)$, and in particular, a finite field $GF(2^n)$ with characteristic 2 is often employed because it is possible to realize a fast implementation.

Among arithmetic operations over finite field, the very fast implementation is possible for addition and additive inverse by the conventional implementation scheme, but considerable time is required for calculating multiplication and multiplicative inverse (hereafter inverse refers to multiplicative inverse unless otherwise indicated). Consequently, a time required for addition of groups over elliptic curves can be evaluated by the required number of multiplication and inverse calculations over field K.

On the other hand, conventionally, inverse calculation over finite field with characteristic 2 requires an enormous amount of calculations compared with multiplication. For this reason, the conventional schemes for implementing group operations over elliptic curves are mainly the implementation using homogeneous coordinates which does not require inverse calculations, even though the required number of multiplication calculations becomes rather large (see A. J. Menczes, S. A. Vanstone: "Elliptic Curve Cryptosystems and Their Implementation", Journal of Cryptology, Vol. 6, pp. 209–289, 1993, for example).

However, in recent years, a scheme for implementing inverse calculation in finite field with characteristic 2 has been developed, and schemes using affine coordinates for expressing elements of group over elliptic curves have been proposed, for example, in E. De Win et al.: "A Fast Software Implementation for Arithmetic Operations in $GF(2^n)$", Advances in Cryptology—ASIACRYPT'96, Lecture Notes in Computer Science 1163, pp. 65–76, Springer-Verlag, 1996. In the following, this scheme will be referred to as De Win's scheme.

Outline of the implementation of finite field according to the De Win's scheme is as follows. When a number of bits for basic operations of a processor is w (8 or 16, for example), all the operations over ground field are calculated in advance by using $GF(2^w)$ as ground field. Also, using an odd degree three term irreducible polynomial over GF(2) in a form of:

$$x^d+x^t+1 (d>t),$$

operations in $GF(2^{wd})$ are represented as:

$$GF(2^{wd}) \cong GF(2w)[x]/(x^d+x^t+1)$$

where a symbol $\cong$ denotes isomorphism of fields (see S. MacLane, G. Birkhoff: "Algebra", Chelsea Publishing, 1967, for detail), and then using this representation, $E(GF(2^{wd}))$ is implemented. In the De Win's scheme, inverse calculation in finite field utilizes the extended Euclidean algorithm over $GF(2^w)$ which is the general inverse calculation method, and many multiplications and divisions are required in executing the extended Euclidean algorithm.

Note that finite fields with characteristic 2 are important because they have data structures suitable for computers, and they can be utilized in error correction coding and cryptography. Individual element of a finite field $GF(2^n)$ can be represented by using n-th degree irreducible polynomial f(X) over GF(2) as:

$$GF(2^n) \cong GF(2)[x]/(f(x))$$

so that it can be represented by polynomial of (n−1)-th degree or less. In other words, by regarding coefficients GF(2) of polynomial as bits, $GF(2^n)$ can be represented in terms of n bits.

When such a representation is used, addition can be represented by exclusive OR of n bits (note that subtraction is the same as addition in the case of field with characteristic 2) so that it can be implemented easily and efficiently. As for the implementation of multiplication and division, there are known schemes which are more efficient than the straightforward scheme for calculating a product of (n−1)-th degree polynomials and then calculating a residue of f(X).

SUMMARY OF THE INVENTION

It is therefore an object of the present invention to provide a scheme for calculating multiplicative inverse and multiplication which realizes efficient multiplicative inverse calculation in $GF(2^{2n})$, by storing preliminary calculation results in a table in view of the fact that more memory capacities are available for software implementation compared with hardware implementation.

It is another object of the present invention to provide a scheme for arithmetic operations in finite field and group operations over elliptic curves capable of realizing a very fast implementation by using an optimal normal basis.

According to one aspect of the present invention there is provided a method for calculating a multiplicative inverse in finite field $GF(2^{2n})$, comprising the steps of: expressing an element $m \in GF(2^{2n})$ as $$m=x\alpha+y(\alpha+1) \ (x, y \in GF(2^n))$$

where $\alpha \in GF(2^{2n}) \setminus GF(2^n)$, $\alpha^2+\alpha+a=0$, and $a \in GF(2^n)$ so that a multiplicative inverse $m^{-1}$ of the element m in the finite field $GF(2^{2n})$ is expressed as a combination of multiplications, additions and a multiplicative inverse calculation in subfield $GF(2^n)$ given by $$m^{-1}=(a(x+y)^2+xy)^{-1}y\alpha+(a(x+y)^2+xy)^{-1}x(\alpha+1)$$

by combining a normal basis [$\alpha$ $\alpha+1$] with extended Euclidean algorithm; and calculating the multiplicative inverse $m^{-1}$ of the element m in the finite field $GF(2^{2n})$ by executing said combination of multiplications, additions and a multiplicative inverse calculation in the subfield $GF(2^n)$.

According to another aspect of the present invention there is provided a method for calculating a multiplication in finite field $GF(2^{2n})$, comprising the steps of: reducing a multiplication of two elements $m_1$ and $m_2$ in $GF(2^{2n})$ into multiplications and additions in subfield $GF(2^n)$ by expressing $m_1$, $m_2 \in GF(2^{2n})$ as $$m_1=x_1\alpha+y_1(\alpha+1), \ m_2=x_2\alpha+y_2(\alpha+1)$$

where $x_i, y_i \in GF(2^n)$, i=1, 2, $\alpha \in GF(2^{2n}) \setminus GF(2^n)$, $\alpha^2+\alpha+a=0$, and $a \in GF(2^n)$ so that a multiplication $m_\theta$ of m1, $m_2 \in GF(2^{2n})$ is given by $$m_\theta=m_1m_2=(x_1x_2+a(x_1+y_1)(x_2+y_2))\alpha$$
$$+(y_1y_2+a(x_i+y_i)(x_2+y_2))(a+1);$$

and calculating the multiplication $m_\theta$ by executing said multiplications and additions in the subfield $GF(2^n)$.

According to another aspect of the present invention there is provided a method for calculating a rational expression in finite field $GF(2^{2n})$ in a form of:

$$\frac{p(X_1, X_2, \cdots, X_r)}{q(X_1, X_2, \cdots, X_r)}$$

where p, $q \in GF(2^{2n})[X_1, X_2, \ldots, X_r]$, comprising the steps of: calculating a multiplication in $GF(2^{2n})$ that arises in calculations using polynomials p, $q \in GF(2^{2n})[X_1, X_2, \ldots, X_r]$ according to a multiplication formula:

$$(x_1\alpha+y_1(\alpha+1)) \times (x_2\alpha+y_2(\alpha+1))$$
$$=(x_1x_2+a(x_1+y_1)(x_2+y_2))\alpha$$
$$+(y_1y_2+a(x_1+y_1)(x_2+y_2))(\alpha+1)$$

where $x_1, x_2, y_1, y_2, a \in GF(2^n)$, $\alpha \notin GF(2^n)$, $\alpha^2+\alpha+a=0$ and $GF(2^{2n})=GF(2^n)(\alpha)$; calculating an inverse $q^{-1}$ of q in $GF(2^{2n})$ according to an inverse calculation formula:

$$(x\alpha+y(\alpha+1))^{-1}$$
$$=(a(x+y)^2+xy)^{-1} (y\alpha+x(\alpha+1))$$

where x, y, $a \in GF(2^n)$, $\alpha \notin GF(2^n)$, $\alpha^2+\alpha+\alpha=0$ and $GF(2^{2n})=GF(2^n)(\alpha)$; and calculating $p \times q^{-1}$ by using said multiplication formula.

According to another aspect of the present invention there is provided a method for calculating a multiplication in finite field $GF(2^{2n})$, comprising the steps of: expressing elements $m_1, m_2 \in GF(2^{2n}) \cong GF(2^n)[x]/(x^2+x+a)$ as $$m_1=x_1+y_1\alpha$$
$$m_2=x_2+y_2\alpha(x_1, x_2, y_1, y_2 \in GF(2^n))$$

where $\alpha \notin GF(2^n)$, $\alpha_2+\alpha+a=0$, and $a \in GF(2^n)$ so that a multiplication $m_1 m_2$ of the elements $m_1$ and $m_2$ in the finite field $GF(2^{2n})$ is expressed as a combination of multiplications and additions in subfield $GF(2^n)$ given by $$m_1m_2=(x_1x_2+ay_1y_2)+((x_1+y_1)(x_2+y_2)+x_1x_2)\alpha$$

by using a standard basis $[1\ \alpha]$; and calculating the multiplication $m_1\ m_2$ of the elements $m_1$ and $m_2$ in the finite field $GF(2^{2n})$ by executing said combination of multiplications and additions in the subfield $GF(2^n)$.

According to another aspect of the present invention there is provided a method for calculating a square in finite field $GF(2^{2n})$, comprising the steps of: expressing an element $m\in GF(2^{2n})\cong GF(2^n)[x]/(x^2+x+a)$ as $$m=x+y\alpha(x,\ y\in GF(2^n))$$

where $\alpha\notin GF(2^n)$, $\alpha^2+\alpha+a=0$, and $a\in GF(2^n)$ so that a square $ma$ of the element $m$ in the finite field $GF(2^{2n})$ is expressed as a combination of multiplications and additions in subfield $GF(2^n)$ given by $$m^2=(x^2+ay^2)+y^2\alpha$$

by using a standard basis $[1\ \alpha]$; and calculating the square $m^2$ of the element $m$ in the finite field $GF(2^{2n})$ by executing said combination of multiplications and additions in the subfield $GF(2^n)$.

According to another aspect of the present invention there is provided a method for calculating a multiplicative inverse in finite field $GF(2^{2n})$, comprising the steps of: expressing an element $m\in GF(2^{2n})\cong GF(2^n)[x]/(x^2+x+a)$ as $$m=x+y\alpha(x,\ y\in GF(2^n))$$

where $\alpha\notin GF(2^n)$, $\alpha^2+\alpha+a=0$, and $a\in GF(2^n)$ so that a multiplicative inverse $m^{-1}$ of the element $m$ in the finite field $GF(2^{2n})$ is expressed as a combination of multiplications, additions and a multiplicative inverse calculation in subfield $GF(2^n)$ given by $$m^{-1}=(x(x+y)+ay^2)^{-1}((x+y)+y\alpha)$$

by using a standard basis $[1\ \alpha]$; and calculating the multiplicative inverse $m^{-1}$ of the element $m$ in the finite field $GF(2^{2n})$ by executing said combination of multiplications, additions and a multiplicative inverse calculation in the subfield $GF(2^n)$.

According to another aspect of the present invention there is provided a method for calculating a rational expression in finite field $GF(2^{2n})$ in a form of:

$$\frac{p(X_1,X_2,\cdots,X_r)}{q(X_1,X_2,\cdots,X_r)}$$

where $p,q\in GF(2^{2n})[X_1,X_2,\ldots,X_r]$, comprising the steps of: calculating a multiplication in $GF(2^{2n})$ that arises in calculations using polynomials $p,q\in GF(2^{2n})[X_1,X_2,\ldots,X_r]$ according to a multiplication formula:

$$(x_1+y_1\alpha)\times(x_2+y_2\alpha)$$
$$=(x_1x_2+ay_1y_2)+((x_1+y_1)(x_2+y_2)+x_1x_2)\alpha$$

and a square calculation formula $$(x_1+y_1\alpha)^2=(x_1^2+ay_1^2)+y_1^2\alpha$$

where $x_1,x_2,y_1,y_2,a\in GF(2^n)$, $\alpha\notin GF(2^n)$, $\alpha^2+\alpha+a=0$ and $GF(2^{2n})=GF(2^n)(\alpha)$; calculating an inverse $q^{-1}$ of $q$ in $GF(2^{2n})$ according to an inverse calculation formula:

$$(x_1+y_1\alpha)^{-1}=(x_1(x_1+y_1)+ay_1^2)^{-1}((x_1+y_1)+y_1\alpha)$$

where $x_1,y_1,a\in GF(2^n)$, $\alpha\notin GF(2^n)$, $\alpha^2+\alpha+a=0$ and $GF(2^{2n})=GF(2^n)(\alpha)$; and calculating $p\times q^{-1}$ by using said multiplication formula.

These methods can be implemented in forms of corresponding devices or articles of manufacture.

Other features and advantages of the present invention will become apparent from the following description taken in conjunction with the accompanying drawings.

BRIEF DESCRIPTION OF THE DRAWINGS

FIG. 14 is a table showing comparison of performances by the first and second embodiments according to the present invention.

DETAILED DESCRIPTION OF THE
PREFERRED EMBODIMENTS

Referring now to FIG. 1 to FIG. 6, the first embodiment of a scheme for calculating multiplicative inverse and multiplication in finite field according to the present invention will be described in detail. In the following description, inverse refers to multiplicative inverse unless otherwise Indicated.

This first embodiment is directed to a scheme for calculating an inverse in finite field $GF(2^{2n})$ by using arithmetic operations in $GF(2^n)$. This first embodiment is based on the fact that $GF(2^{2n})$ is a two-dimensional vector space in $GF(2^n)$ so that by using:

$$\alpha \in GF(2^{2n}) \backslash GF(2^n), \ \alpha^2 + \alpha + a = 0, \ a \in GF(2^n)$$

where a symbol\denotes a difference set, an element $m \in GF(2^{2n})$ can be expressed as:

$$m = x\alpha + y(\alpha + 1)(x, y \in GF(2^n))$$

Then, when an element $m \in GF(2^{2n})$ is expressed by:

$$m = x\alpha + y(\alpha + 1)(x, y \in GF(2^n))$$

an inverse of m in $GF(2^{2n})$ can be calculated by utilizing the extended Euclidean algorithm as:

$$(a(x+y)^2 + xy)^{-1} y\alpha + (a(x+y)^2 + xy)^{-1} x(\alpha + 1)$$

Figure 1:
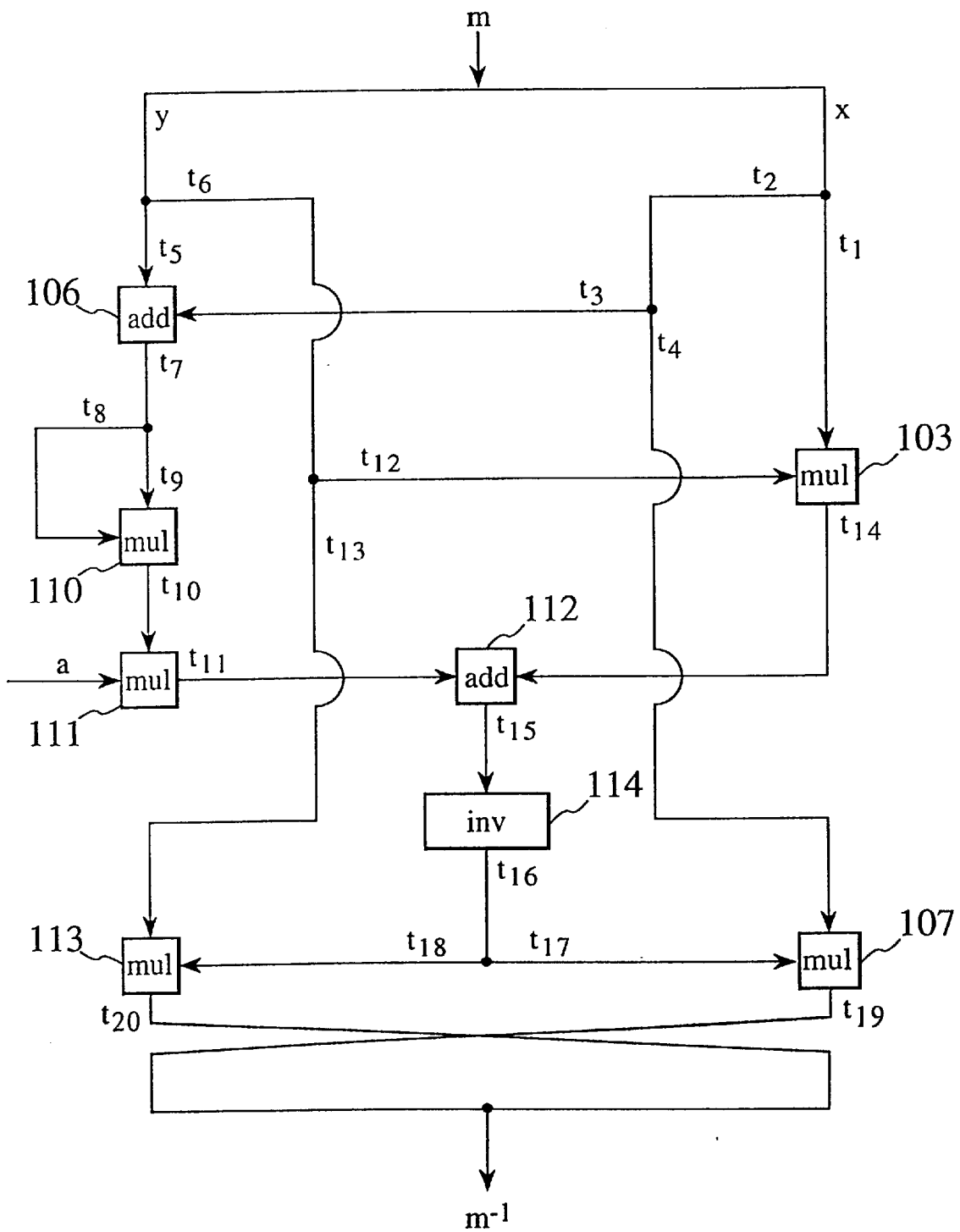
FIG. 1 is a block diagram of a 2n bit inverse calculation device according to the first embodiment of the present invention.

Therefore, the inverse calculation requires two addition calculations in $GF(2^n)$ (namely $t_7 = x+y = t_3 + t_5$ and $t_{15} = a(x+y)^2 + xy = t_{11} + t_{14}$ in a configuration of FIG. 1)), five multiplication calculations (namely $t_{10} = (x+y)^2 = t_8 \times t_9$, $t_{11} = a(x+y)^2 = at_{10}$, $t_{14} = xy = t_1 \times t_{12}$, $t_{19} = t_{17} \times t_4$, and $t_{20} = t_{13} \times t_{18}$ in a configuration of FIG. 1), and one inverse calculation in $GF(2^n)$ (namely $t_{16} = t_{15}^{-1}$ in a configuration of FIG. 1).

FIG. 1 shows a configuration of a 2n bit inverse calculation device according to this first embodiment. This 2n bit inverse calculation device of FIG. 1 comprises two n bit exclusive OR units (add) 106 and 112, five n bit multiplication units (mul) 103, 107, 110, 111 and 113, and one n bit inverse calculation unit (inv) 114, which are configured to carry out the following processing.

STEP 1: A 2n bit input m is split into two n bit parts x and y.

STEP 2: x is duplicated to yield $t_1$ and $t_2$, and $t_1$ is set as an input to the n bit multiplication unit 103.

STEP 3: $t_2$ is duplicated to yield $t_3$ and $t_4$, and $t_3$ is set as an input to the n bit exclusive OR unit 106 while t is set as an input to the n bit multiplication unit 107.

STEP 4: y is duplicated to yield $t_5$ and $t_6$, and $t_5$ is set as an input to the n bit exclusive OR unit 106.

STEP 5: An exclusive OR $t_7$ of the inputs $t_3$ and $t_5$ is calculated by the n bit exclusive OR unit 106.

STEP 6: $t_7$ is duplicated to yield $t_8$ and $t_9$, and $t_8$ and $t_9$ are set as inputs to the n bit multiplication unit 110.

STEP 7: A product $t_{10}$ of the inputs $t_8$ and $t_9$ is calculated by the n bit multiplication unit 110, and set as an input to the n bit multiplication unit 111.

STEP 8: A product $t_{11}$ of a constant a and the input $t_{10}$ is calculated by the n bit multiplication unit 111, and, set as an input to the n bit exclusive OR unit 112.

STEP 9: $t_6$ is duplicated to yield $t_{12}$ and $t_{13}$, and $t_{12}$ is set as an input to the n bit multiplication unit 103 while $t_{13}$ is set as an input to the n bit multiplication unit 113.

STEP 10: A product $t_{14}$ of the inputs $t_{11}$ and $t_{12}$ is calculated by the n bit multiplication unit 103, and set as an input to the n bit exclusive OR unit 112.

STEP 11: An exclusive OR $t_{15}$ of the inputs $t_{11}$ and $t_{14}$ is calculated by the n bit exclusive OR unit 112, and set as an input to the n bit inverse calculation unit 114.

STEP 12: An inverse $t_{16}$ of the input $t_{15}$ is calculated by the n bit inverse calculation unit 114.

STEP 13: $t_{16}$ is duplicated to yield $t_{17}$ and $t_{18}$, and $t_{17}$ is set as an input to the n bit multiplication unit 107 while tie is set as an input to the n bit multiplication unit 113.

STEP 14: A product $t_{19}$ of the inputs $t_4$ and $t_{17}$ is calculated by the n bit multiplication unit 107.

STEP 15: A product $t_{20}$ of the inputs $t_{13}$ and tie is calculated by the n bit multiplication unit 113.

STEP 16: $t_{19}$ and $t_{20}$ are joined and outputted as an inverse $m^{-1}$ of the input m (where the output result is in 2n bits).

Note that the n bit inverse calculation unit 114 can be realized by recursively regarding $t_{15}$ as m in this configuration of FIG. 1, if it cannot be implemented in a form of FIG. 3 described below because of the limitation on cache memory.

Note also that, in this configuration of FIG. 1, t: and $t_4$ are the same value (x), so that there is no need to look up logarithmic conversion table to be described below in the n bit multiplication units 103 and 107 twice. By using the value obtained by the n bit multiplication unit 103 directly in the n bit multiplication unit 107, it is possible to reduce a number of times for looking up the logarithmic conversion table. The similar remarks also apply to $t_8$ and $t_9$ pair, $t_{12}$ and $t_{13}$ pair, and $t_{17}$ and $t_{18}$ pair.

Figure 2:
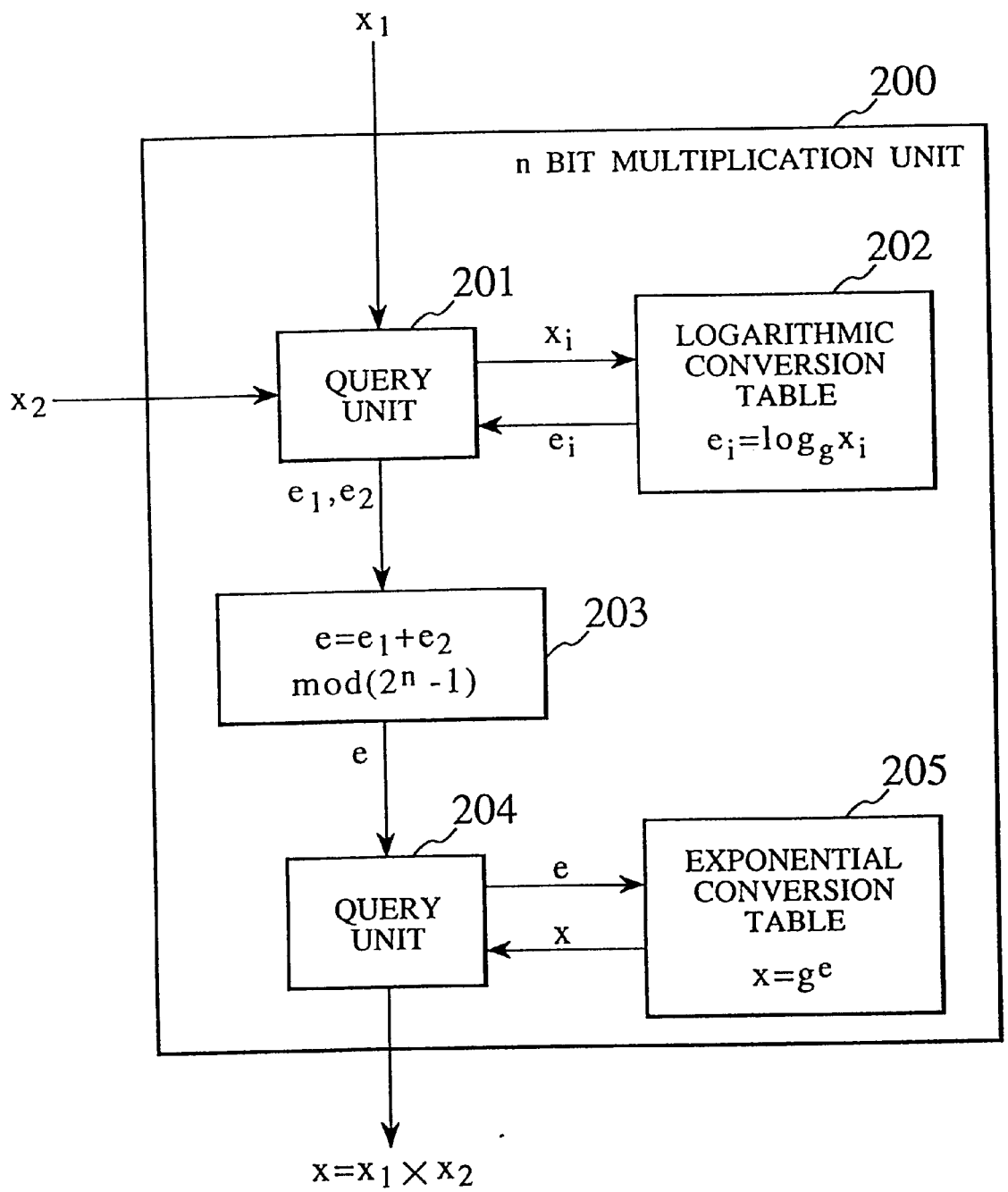
FIG. 2 is a block diagram of an n bit multiplication unit that can be used in the 2n bit inverse calculation device FIG. 1.

FIG. 2 shows one exemplary configuration of the n bit multiplication unit that can be used in the configuration of FIG. 1.

In this n bit multiplication unit 200, in carrying out multiplication in $GF(2^n)^x$, where $GF(2^n)^x$ denotes the multiplicative group of $GF(2^n)$, when a logarithmic conversion table and an exponential conversion table can be stored in a memory, a logarithmic conversion table 202 and an exponential conversion table 205 are provided as shown in FIG. 2.

Then, for two elements $x_1$ and $x_2$ in $GF(2^n)^x$ entered by a query unit 201, corresponding two logarithms $e_1 = \log_g x_1$ and $e_2 = \log_g x_2$ are obtained by looking up the logarithmic conversion table 202, and $e = e_1 + e_2 \mod(2^n - 1)$ is calculated by an addition unit 203. Then, for this e entered by a query unit 204, an exponential $g^e$ is obtained by looking up the exponential conversion table 205, so as to obtain a product $x = x_1 \times x_2$. Here, an element g is set to be a primitive root $GF(2^n)^x = GF(2^n) \backslash \{0\}$ in $GF(2^n)'$.

More specifically, this n bit multiplication unit 200 of FIG. 2 carries out the following processing.

STEP 1: The query unit 201 enters two inputs $x_1$ and $x_2$ into the logarithmic conversion table 202.

STEP 2: Two logarithms $e_i = \log_g x_1$ and $e_2 = \log_g x_2$ are obtained by using the logarithmic conversion table 202, returned to the query unit 201.

STEP 3: The query unit 201 enters $e_1$ and $e_2$ into the addition unit 203.

STEP 4: The addition unit 203 calculates $e=e_1+e_2$ mod $(2^n-1)$, and enters it into the query unit 204.

STEP 5: The query unit 204 enters e into the exponential conversion table 205.

STEP 6: The exponential $x=g^e$ is obtained by using the exponential conversion table 205, and returned to the query unit 204.

STEP 7: The query unit 204 outputs x as the product of $x_1$ and $x_2$.

Figure 3:
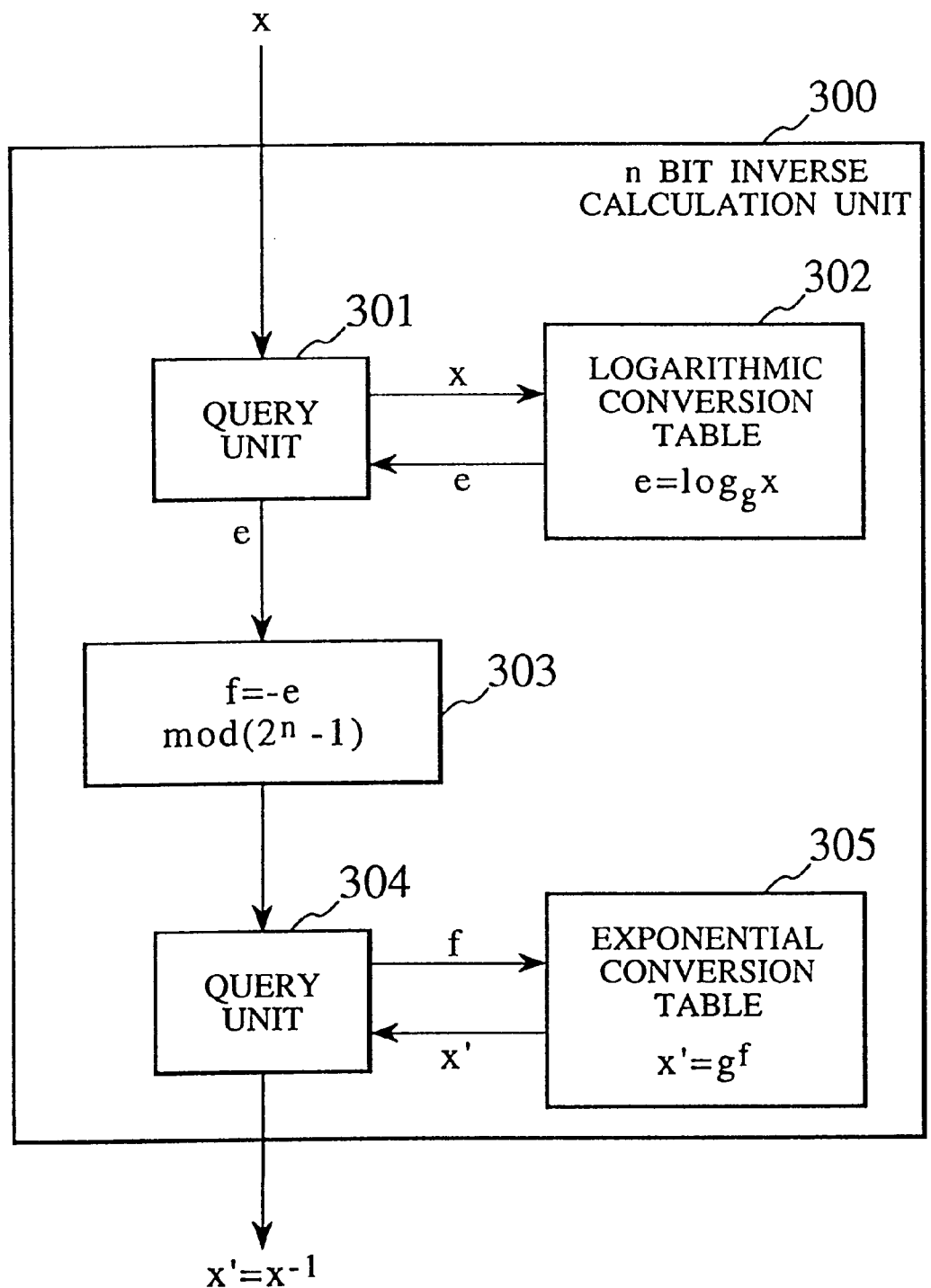
FIG. 3 is a block diagram of an n bit inverse calculation unit that can be used in the 2n bit inverse calculation device of FIG. 1.

FIG. 3 shows an exemplary configuration of the n bit inverse calculation unit that can be used in the configuration of FIG. 1.

In this n bit inverse calculation unit 300, the inverse calculation in $GF(2^n)^x$ is carried out as follows. Namely, for an element x in $GF(2^n)^x$ entered by a query unit 301, a logarithm $e=\log_g x$ is obtained by looking up a logarithmic conversion table 302, and $f=-e\ \mathrm{mod}(2^{n}1)$ is calculated by a complement calculation unit 303. Then, for this f entered by a query unit 304, an exponential $g^f$ is obtained by looking up an exponential conversion table 305, so as to obtain an inverse $x'=x^{-1}$. Note that the logarithmic conversion table 202 and the exponential conversion table 205 of FIG. 2 can be directly utilized as the logarithmic conversion table 302 and the exponential conversion table 305 of FIG. 3.

More specifically, this n bit inverse calculation unit 300 of FIG. 3 carries out the following processing.

STEP 1: The query unit 301 enters an input x into the logarithmic conversion table 302.

STEP 2: The logarithm $e=\log_g x$ is obtained by using the logarithmic conversion table 302, and returned to the query unit 301.

STEP 3: The query unit 301 enters e into the complement calculation unit 303.

STEP 4: The complement calculation unit 303 calculates $f=-e\ \mathrm{mod}(2^n-1)$, and enters it into the query unit 304.

STEP 5: The query unit 304 enters f into the exponential conversion table 305.

STEP 6: The exponential $x'=g^f$ is obtained by using the exponential conversion table 305, and returned to the query unit 304.

STEP 7: The query unit 304 outputs x' as the inverse of x.

Figure 4:
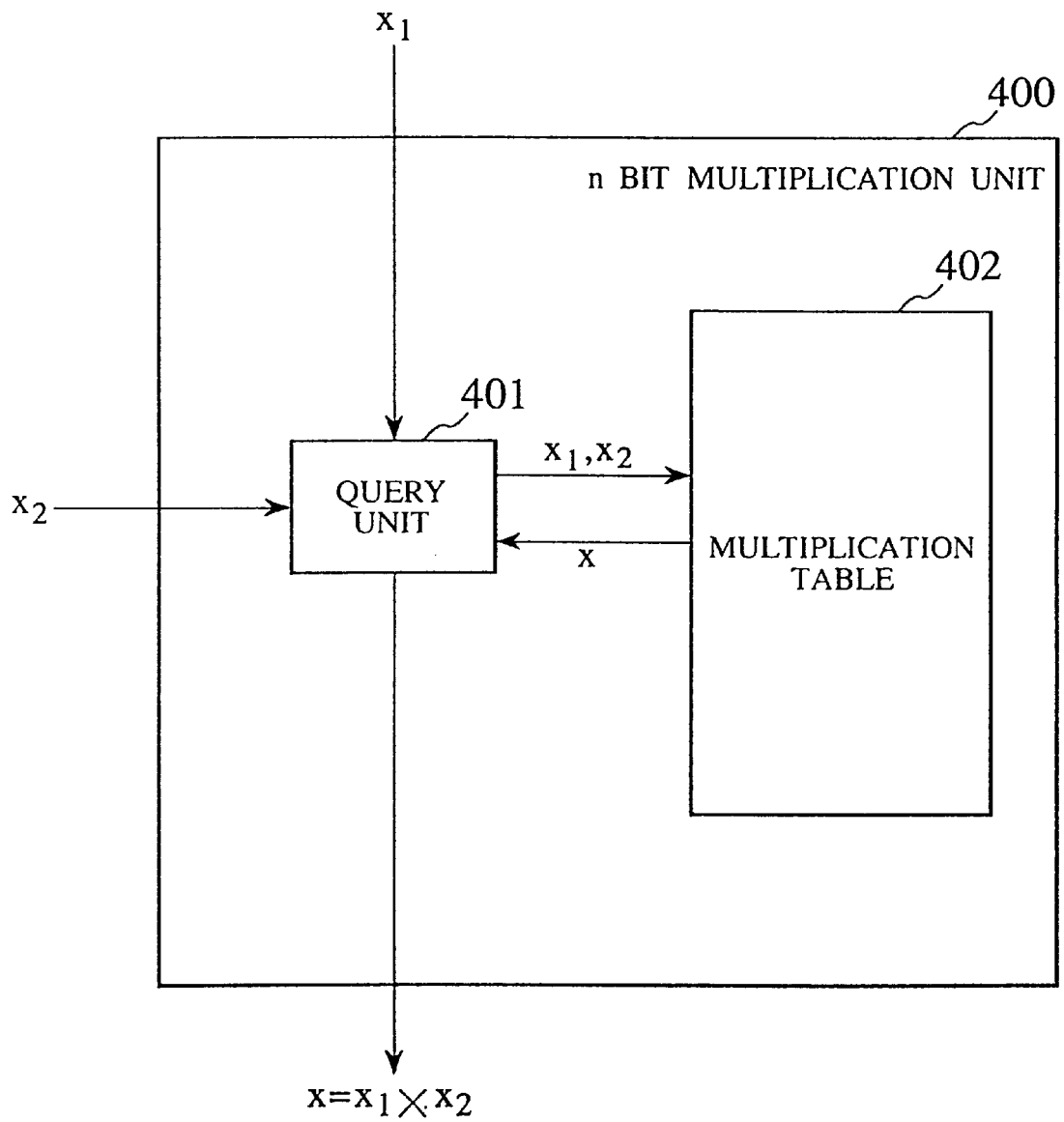
FIG. 4 is a block diagram of another n bit multiplication unit that can be used in the 2n bit inverse calculation device of FIG. 1.

FIG. 4 shows another exemplary configuration of the n bit multiplication unit that can be used in the configuration of FIG. 1.

In this n bit multiplication unit 400, in carrying out multiplication in $GF(2^n)$ when a multiplication table can be stored in a memory, a multiplication table 402 is provided as shown in FIG. 4.

Then, for two elements $x_1$ and $x_2$ in $GF(2^n)$ entered by a query unit 401, a corresponding multiplication result $x=x_1\times x_2$ is obtained by looking up the multiplication table 402.

More specifically, this n bit multiplication unit 400 of FIG. 4 carries out the following processing.

STEP 1: The query unit 401 enters two inputs $x_1$ and $x_2$ into the multiplication table 402.

STEP 2: The multiplication result $x=x_1\times x_2$ is obtained by using the multiplication table 402, and returned to the query unit 401.

STEP 3: The query unit 401 outputs x as the product of $x_1$ and $x_2$.

Figure 5:
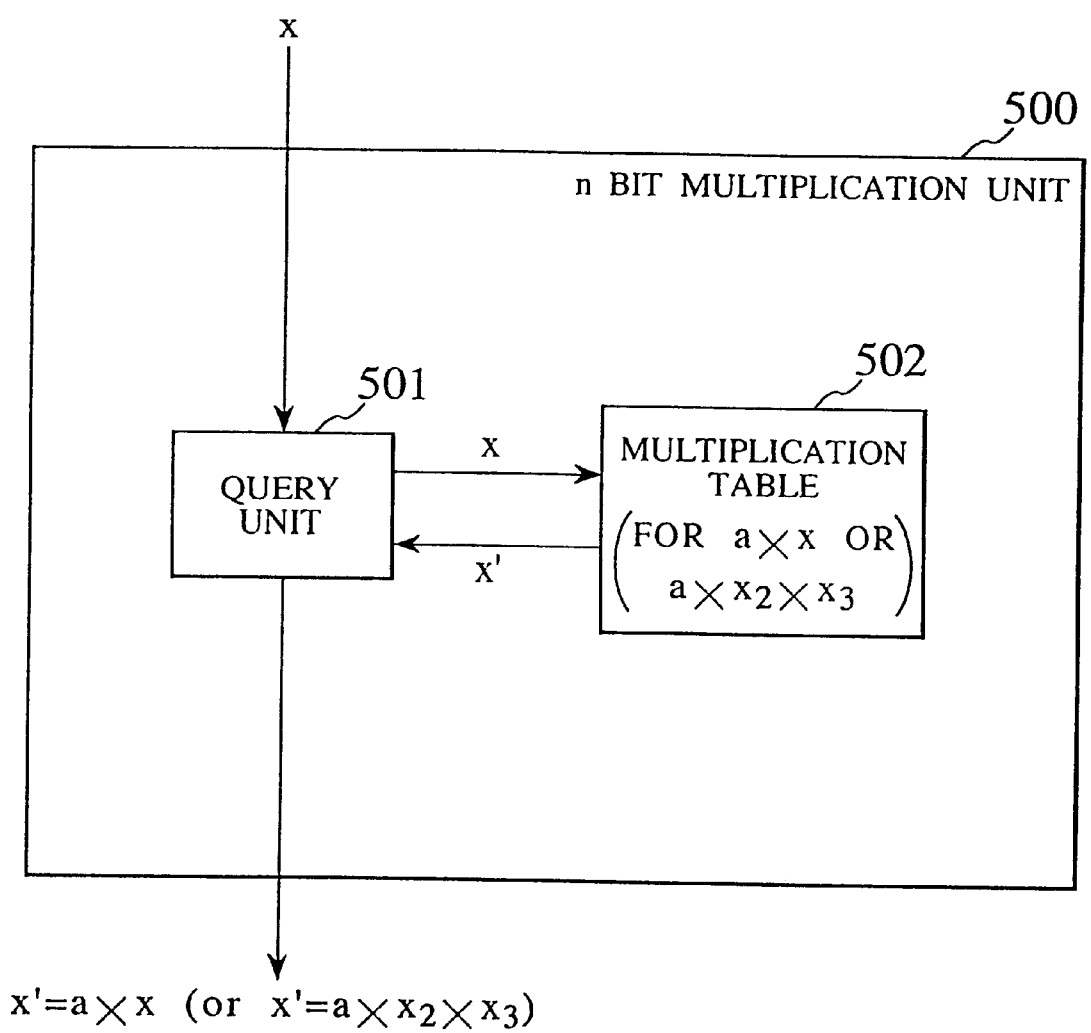
FIG. 5 is a block diagram of another n bit multiplication unit that can be used in the 2n bit inverse calculation device of FIG. 1.

FIG. 5 shows another exemplary configuration of the n bit multiplication unit that can be used in the configuration of FIG. 1.

This n bit multiplication unit 500 is for a case where one of multiplying number ($x_1=a$) is constant, as in the n bit multiplication unit 111 of FIG. 1. Consequently, a multiplication table 502 for $x=a\times x_2$ (or $a\times x_2\times x_3$) is provided as shown in FIG. 5.

Then, for another multiplying number $x_2$ entered by a query unit 501, a corresponding multiplication result $x=a\times x_2$ is obtained by looking up the multiplication table 502. Note that this n bit multiplication unit 500 can be similarly used for a case where a number of multiplying numbers is increased, as in a case of obtaining $ax_1x_2$.

More specifically, this n bit multiplication unit 500 of FIG. 5 carries out the following processing.

STEP 1: The query unit 501 enters an input x into the multiplication table 502.

STEP 2: The multiplication result $x'=a\times x$ is obtained by using the multiplication table 502, and returned to the query unit 501.

STEP 3: The query unit 501 outputs x' as the product of a and x.

Now, when the n bit multiplication unit cannot be implemented in any of the configurations of FIG. 2, FIG. 4 and FIG. 5 described above because of the limitation on cache memory, it is possible to implement the n bit multiplication unit from n/2 bit multiplication units as follows. Note that this implementation can be used recursively.

Namely, the multiplication in arbitrary 2n bits can be reduced to multiplications in n bits and additions in n bits. When n is sufficiently small, the n bit multiplication can be realized by the fast implementation of any of FIG. 2, FIG. 4 and FIG. 5 described above, so that the following description is given in terms of a parameter n.

For two elements $m_1, m_2 \in GF(2^{2n})$ expressed by:

$$m_1 = x_1\alpha + y_1(\alpha+1),$$
$$m_2 = x_2\alpha + y_2(\alpha+1),\ (x_i, y_i, \in GF(2^n), i=1, 2),$$

a product $m_0$ of $m_1$ and $m_2$ can be expressed as:

$$m_0 = m_1 m_2 = (x_1 x_2 + a(x_1+y_1)(x_2+y_2))\alpha$$
$$+ (y_1 y_2 + a(x_1+y_1)(x_2+y_2))(\alpha+1)$$

Thus the multiplication in $GF(2^n)$ can be reduced to the arithmetic operations in its subfield, and the multiplication table or the logarithmic conversion table and the exponential conversion table required for the arithmetic operations in the subfield can be realized in smaller size.

Figure 6:
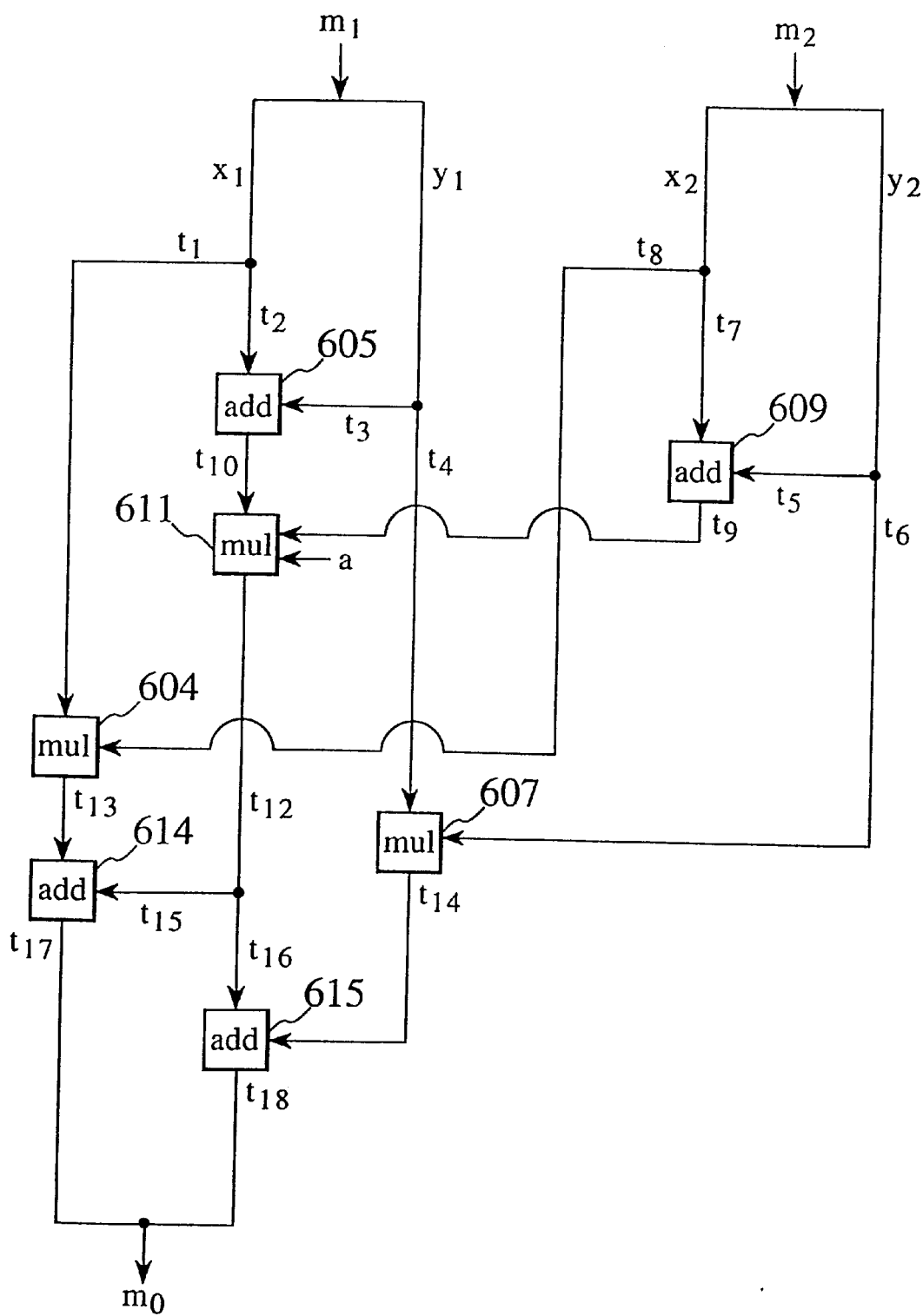
FIG. 6 is a block diagram of a 2n bit multiplication device according to the first embodiment of the present invention.

FIG. 6 shows an exemplary configuration of a 2n bit multiplication device according to this first embodiment. This 2n bit multiplication device of FIG. 6 comprises four n bit exclusive OR units (add) 605, 609, 614 and 615, and three n bit multiplication units (mul) 604, 607 and 6111 which are configured to carry out the following processing.

STEP 1: A 2n bit input $m_1$ is split into two n bit parts $x_1$ and $y_1$.

STEP 2: A 2n bit input $m_2$ is split into two n bit parts $x_2$ and $y_2$.

STEP 3: $x_1$ is duplicated to yield $t_1$ and $t_2$, and $t_1$ is set as an input to the n bit multiplication unit 604 while $t_2$ is set as an input to the n bit exclusive OR unit 605.

STEP 4: $y_1$ is duplicated to yield $t_3$ and $t_4$, and $t_3$ is set as an input to the n bit exclusive OR unit 605 while $t_4$ is set as an input to the n bit multiplication unit 607.

STEP 5: $y_2$ is duplicated to yield $t_5$ and $t_6$, and $t_5$ is set as an input to the n bit exclusive OR unit 609 while t is set as an input to the n bit multiplication unit 607.

STEP 6: $x_2$ is duplicated to yield $t_7$ and $t_8$, and $t_7$ is set as an input to the n bit exclusive OR unit 609 while $t_8$ is set as an input to the n bit multiplication unit 604.

STEP 7: An exclusive OR $t_9$ of the inputs $t_5$ and $t_7$ is calculated by the n bit exclusive OR unit 609, and set as an input to the n bit multiplication unit 611.

STEP 8: An exclusive OR $t_{10}$ of the inputs $t_2$ and $t_3$ is calculated by the n bit exclusive OR unit 605, and set as an input to the n bit multiplication unit 611.

STEP 9: A product $t_{12}$ of two inputs $t_9$ and $t_{10}$ and a constant a is calculated by the n bit multiplication unit 611. Here, the n bit multiplication unit 611 can be in a configuration of FIG. 5 described above.

STEP 10: A product $t_{13}$ of the inputs $t_1$ and $t_8$ is calculated by the n bit multiplication unit 604, and set as an input to the n bit exclusive OR unit 614.

STEP 11: A product $t_{14}$ of the inputs $t_4$ and $t_6$ is calculated by the n bit multiplication unit 607, and set as an input to the n bit exclusive OR unit 615.

STEP 12: $t_{12}$ is duplicated to yield $t_{15}$ and $t_{16}$, and $t_{15}$ is set as an input to the n bit exclusive OR unit 614 while $t_{16}$ is set as an input to the n bit exclusive OR unit 615.

STEP 13: An exclusive OR $t_{17}$ of the inputs $t_{13}$ and $t_{15}$ is calculated by the n bit exclusive OR unit 614.

STEP 14: An exclusive OR $t_{18}$ of the inputs $t_{14}$ and $t_{16}$ is calculated by the n bit exclusive OR unit 615.

STEP 15: $t_{17}$ and $t_{18}$ are Joined and outputted as a product me of the inputs $m_1$ and $m_2$.

Thus it can be seen that the product of elements In $GF(2^{2n})$ can be calculated by four multiplications and four additions in $GF(2^n)$.

Note that this reduction of 2n bit multiplication to n bit multiplications and additions can be applied to each 2n bit multiplication appearing in the 2n bit inverse calculation of FIG. 1 described above.

Note also that the above noted fact that, when an element $m \emptyset GF(2^{2n})$ is expressed by:

$$m = x\alpha + y(\alpha+1)(x, y \in GF(2^n))$$

an inverse $m^{-1}$ of m in $GF(2^{2n})$ can be expressed by:

$$m^{-1} = (a(x+y)^2+xy)^{-1}y\alpha + (a(x+y)^2+xy)^{-1}x(\alpha+1)$$

can be demonstrated as follows (assuming that $m \neq 0$).

Namely, for two elements $m_1, m_2 \emptyset GF(2^{2n})$ expressed by:

$$m_1 = x_1\alpha + y_1(\alpha+1),$$

$$m_2 = x_2\alpha + y_2(\alpha+1), (x_i, y_i \in GF(2^n), i=1, 2),$$

a product $m_0$ of $m_1$ and $m_2$ can be expressed as:

$$m_0 = m_1 m_2 = (x_1 x_2 + a(x_1+y_1)(x_2+y_2))\alpha$$

$$+ (y_1 y_2 + a(x_1+y_1)(x_2+y_2))(\alpha+1)$$

and therefore it follows that:

$$m \times m^{-1} = \left\{ \frac{xy}{a(x+y)^2+xy} + a(x+y)\frac{xy}{a(x+y)^2+xy} \right\}\alpha +$$

$$\left\{ \frac{xy}{a(x+y)^2+xy} + a(x+y)\frac{x+y}{a(x+y)^2+xy} \right\}(\alpha+1)$$

$$= \alpha + (\alpha+1) = 1$$

Now, the algorithm of this first embodiment is compared with a combination of conventional algorithms. Namely, by using the algorithm of Agnew et al. mentioned above, the inverse calculation in $GF(2^{2n})$ can be reduced to multiplications in $GF(2^{2n})$ and inverse calculation and shift operation in $GF(2^n)$. That is, Agnew:

one inverse calculation in $GF(2^n)$ two multiplications in $GF(2^{2n})$ one shift operation in $GF(2^n)$ Then, when the multiplication in $GF(2^{2n})$ is realized by arithmetic operations in subfield $GF(2^n)$ by using the scheme of Pincin mentioned above, it requires four multiplications and four additions in $GF(2^n)$. Consequently, Agnew+Pincin:

one inverse calculation in $GF(2^n)$ eight multiplications in $GF(2^n)$ eight additions in $GF(2^n)$ one shift operation in $GF(2^n)$ In contrast, the required arithmetic operations in the first embodiment are as follows.

First Embodiment:

one inverse calculation in $GF(2^n)$ five multiplications in $GF(2^n)$ two additions in $GF(2^n)$ one shift operation in $GF(2^n)$ Thus it can be seen that the first embodiment can save three multiplications in $GF(2^n)$ and six additions in $GF(2^n)$.

Next, an amount of calculations in an application to cryptographic processing will be described.

For F function used in the encryption processing of 64 bit block cipher, the use of cube calculation and inverse calculation is recommended. For an exemplary case of 64 bit cipher, a case of realizing the cube calculation by the scheme of Pincin and a case of realizing the inverse calculation by the first embodiment can be compared as follows.

Cube Calculation: (Pincin)

seven multiplications in $GF(2^{16})$ three additions in $GF(2^{16})$

Inverse Calculation: (First Embodiment)

one inverse calculation in $GF(2^{16})$ five multiplications in $GF(2^{16})$ two additions in $GF(2^{16})$ Consider a case of implementation on workstation. Most of the present-day CPUs have a cache memory in size of 256 KB or more, so that the logarithmic conversion table and the exponential conversion table for subfield $GF(2^{16})$ can be realized as fast accessible tables.

When the required number of times for looking up table and calculation contents for e and f in the multiplication and the inverse calculation described above, it can be seen that the inverse calculation can be realized faster than the multiplication because the inverse calculation is a monomial operation. Thus it can be seen that, in comparison with the cube calculation, the first embodiment can save one multiplication or more in $GF(2^{16})$ and one addition in $GF(2^{16})$ As described, according to this first embodiment, the normal basis and the extended Euclidean algorithm are combined to reduce the inverse calculation in $GF(2^{2n})$ to multiplications, additions, and an inverse calculation in $GF(2^n)$, so as to reduce a required number of multiplications and additions in subfield $GF(2^n)$ compared with the conventional scheme.

Also, according to this first embodiment, binomial operation (multiplication) in subfield $GF(2^n)^x$ is converted into binomial operation (addition) in $Z/(2^n-1)Z$ (additive cyclic group of order $(2^n-1)$) where calculation using monomial operation (logarithmic conversion) is easier, and this calculation result is re-converted into monomial operation (exponential conversion) in subfield $GF(2^n)$. Here, in order to provide a multiplication table in $GF(2^n)$ for use in binomial operations, a memory of $(2^n)^2 \times n$ bits will be required, but the logarithmic conversion table and the exponential conversion table storing preliminary calculation results for monomial operations of the logarithmic conversion and the exponential conversion will be required to have a size of about $2^n \times n$ bits each.

Also, according to this first embodiment, when a sufficient amount of fast read accessible memory is available, a multiplication table storing calculation results for binomical operations (multiplications) in $GF(2^n)$ can be provided, so as to reduce a processing load required for table look up and calculation in $Z/(2^n-1)Z$.

Also, according to this first embodiment, when one of the numbers to be multiplied together in multiplication is fixed ($x_1=a$), a multiplication table storing calculation results for multiplications ($x=a \times x_2$ or $x=a \times x_2 \times x_3$) in $GF(2^n)$ can be provided.

Also, according to this first embodiment, multiplication in $GF(2^n)$ is reduced to arithmetic operations in subfield $GF(2^{n/2})$. A table for storing multiplication result in $GF(2^n)$ requires about $(2^n)^2 \times n$ bits, but a table for storing multiplication result in $GF(2^{n/2})$ requires about $(2^{n/2})^2 \times (n/2) = (2^n) \times (n/2)$ bits. Consequently, by iterating the reduction of multiplication into multiplication in subfield, it becomes possible to utilize a subfield that has a parameter n for which a table size can be reduced to that of a fast read accessible memory (cache memory).

Also, according to this first embodiment, when the logarithmic conversion table and the exponential conversion table cannot be stored because of a limited size of cache memory, multiplication in $GF(2^n)$ is reduced to multiplication in $GF(2^{n/2})$ and a calculation algorithm in that subfield is applied. Similarly, when an inverse calculation in $GF(2^n)$ cannot be executed, it is reduced to multiplications and an inverse calculation in $GF(2^{n/2})$ and a calculation algorithm in that subfield is applied.

Also, according to this first embodiment, the number of table accesses is reduced by storing values read out from tables for one calculation operation and utilizing them in other calculation operations.

It is to be noted that, according to the above described scheme of the first embodiment, when a finite field $GF(2^{2/n})$ is represented by:

$$GF(2^{2n}) \cong GF(2^n)[x]/(x^2+x+a)(a \in GF(2^n))$$

and a normal basis $[\alpha, \alpha+1]$ is taken as a basis when $GF(2^{2n})$ is regarded as a two-dimensional vector space in $GF(2^n)$ where $\alpha$ is a root of $x^2+x+a=0$, multiplication in $GF(2^{2n})$ can be calculated by arithmetic operations in $GF(2^n)$ because of the following equation.

$$(x_1\alpha+y_1(\alpha+1)) \times (x_2\alpha+y_2(\alpha+1))$$
$$=(x_1x_2+a(x_1+y_1)(x_2+y_2))\alpha$$
$$+(y_1y_2+a(x_1+y_1)(x_2+y_2))(\alpha+1)$$

Similarly, the square can be calculated by the following equation:

$$(x\alpha+y(\alpha+1))^2$$
$$(x^2+a(x^2+y^2))\alpha+(y^2+a(x^2+y^2))(\alpha+1)$$

while the inverse can be calculated by the following equation:

$$(x\alpha+y(\alpha+1))^{-1}$$
$$=(a(x+y)^2+xy)^{-1}(y\alpha+x(\alpha+1))$$

According to this scheme of the first embodiment, when n is divisible by a large number (such as 16 or more), it becomes possible to obtain an inverse in finite field $GF(2^n)$ more efficiently than the De Win's scheme mentioned above. As a consequence, it becomes possible to realize a faster implementation of group operations over elliptic curves than the De Win's scheme by reducing a required number of multiplications and divisions.

Also, according to this first embodiment, when elements other than a point at infinity 0 of a group over elliptic curves $E(GF(2^{2n}))$ in finite field $GF(2^{2n})$ are expressed in terms of affine coordinates (x, y), group operations over elliptic curves can be expressed as rational expressions in x and y, and it is possible to calculate a rational expression in a form of:

$$\frac{p(X_1, X_2, \cdots, X_r)}{q(X_1, X_2, \cdots, X_r)}$$

where $p, q \in GF(2^{2n})[X_1, X_2, \ldots, X_r]$ by calculating a multiplication in $GF(2^{2n})$ that arises in calculations using polynomials $p, q \in GF(2^{2n})[X_1, X_2, \ldots, X_r]$ according to:

$$(x_1\alpha+y_1(\alpha+1)) \times (x_2\alpha+y_2(\alpha+1))$$
$$=(x_1x_2+a(x_1+y_1)(x_2+y_2))\alpha$$
$$+(y_1y_2+a(x_1+y_1)(x_2+y_2))(\alpha+1)$$

where $x_1, x_2, y_1, y_2, a \in GF(2^n)$, $\alpha \notin GF(2^n)$, $\alpha^2+\alpha+a=0$ and $GF(2^{2n})=GF(2^n)(\alpha)$;

and calculating an inverse $q^{-1}$ of q in $GF(2^{2n})$ according to:

$$(x\alpha+y(\alpha+1))^{-1}$$
$$=(a(x+y)^2+xy)^{-1}(y\alpha+x(\alpha+1))$$

where $x, y, a \in GF(2^n)$, $\alpha \notin GF(2^n)$, $\alpha^2+\alpha+a=0$ and $GF(2^{2n})=GF(2^n)(\alpha)$;

and then calculating $p \times q^{-1}$ by repeating the same multiplication as described above for calculations using polynomials p and q.

Referring now to FIG. 7 to FIG. 14, the second embodiment of a scheme for arithmetic operations in finite field according to the present invention will be described in detail.

The first embodiment described above is based on the fact that, when a finite field $GF(2^{2n})$ is represented by:

$$GF(2^{2n}) \cong GF(2n)[x]/(x^2+x+a)(a \in GF(2^n))$$

and a normal basis $[\alpha, \alpha+1]$ is taken as a basis when $GF(2^{2n})$ is regarded as a two-dimensional vector space in $GF(2^n)$ where $\alpha$ is a root of $x^2+x+a=0$, multiplication in $GF(2^{2n})$ can be calculated by arithmetic operations in $GF(2^n)$ because of the following equation.

$$(x_1\alpha+y_1(\alpha+1)) \times (x_2\alpha+y_2(\alpha+1))$$
$$=(x_1x_2+a(x_1+y_1)(x_2+y_2))\alpha$$
$$+(y_1y_2+a(x_1+y_1)(x_2+y_2))(\alpha+1)$$

Similarly, the square can be calculated by the following equation:

$$(x\alpha+y(\alpha+1))^2$$
$$=(x^2+a(x^2+y^2))\alpha+(y^2+a(x^2+y^2))(\alpha+1)$$

while the inverse can be calculated by the following equation:

$$(x\alpha+y(\alpha+1))^{-1}$$
$$=(a(x+y)^2+xy)^{-1}(y\alpha+x(\alpha+1))$$

so that operations in GF($2^{2n}$) can be calculated by using arithmetic operations in GF($2^n$).

This first embodiment realizes the fast implementation by utilizing successive quadratic extensions of finite field. However, there is no evidence that a basis taken in realizing quadratic extensions is an optimal one. In this second embodiment, the faster implementation is realized by taking a basis different from the normal basis used in the first embodiment. That is, this second embodiment realizes the faster implementation by using a standard basis instead of the normal basis of the first embodiment.

More specifically, in this second embodiment, when a finite field GF($2^{2n}$) is represented by:

$$GF(2^{2n}) \cong GF(2^n)[x]/(x^2+x+a)(a \in GF(2^n))$$

and a standard basis [1 α] is taken as a basis when GF($2^{2n}$) is regarded as a two-dimensional vector space in GF($2^n$) where α is a root of $x^2+x+a=0$ arithmetic operations can be calculated as follows.

Addition:

$$(x_1+y_1\alpha)+(x_2+y_2\alpha)=(x_1+x_2)+(y_1+y_2)\alpha \quad (1)$$

Multiplication:

$$(_1+y_1\alpha) \times (x_2+y_2\alpha)$$
$$=(x_1x_2+ay_1y_2)+((x_1+y_1)(x_2+y_2+x_1x_2)\alpha \quad (2)$$

Square:

$$(x_1+y_1\alpha)^2=(x_1^2+ay_1^2)\alpha+y_1^2\alpha \quad (3)$$

Inverse:

$$(x_1+y_1\alpha)^{-1}=(x_1(x_1+y_1)+ay_1^2)^{-1}(x_1+y_1)+y_1\alpha \quad (4)$$

Now this second embodiment will be described in further detail with references to the drawings.

A finite field GF($2^{e2^t}$) has a subfield GF($2^{e2^{t-1}}$), and can be regarded as a vector space in GF($2^{e2^{t-1}}$). From this fact it follows that operations in GF($2^{e2^t}$) can be reduced to operations in GF($2^{e2^{t-1}}$), and similarly, they can be reduced to operations in GF($2^{e2^{t-2}}$), . . . , GF($2^e$), as explicitly noted above.

In further detail, in this second embodiment, operations in GF($2^{e2^t}$) are reduced to operations in GF($2^{e2^{t-1}}$), operations in GF($2_{e2^{t-1}}$) are reduced to operations in GF($2^{e2^{t-2}}$), and so on so forth sequentially, until operations are finally reduced to those in GF($2^e$). Then, arithmetic operations in GF($2^e$) are realized as follows.

Figure 7:
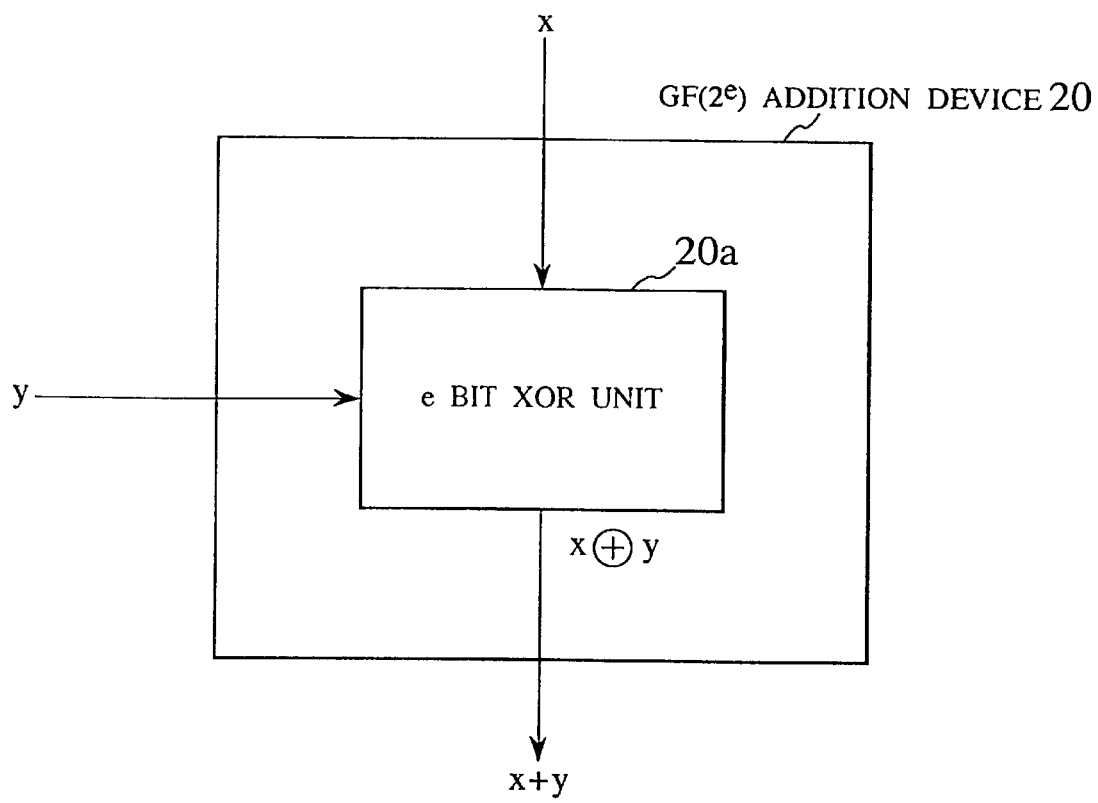
FIG. 7 is a block diagram of a $GF(2^e)$ addition device according to the second embodiment of the present invention.

FIG. 7 shows a configuration of a GF($2^e$) addition device 20 to be used for arithmetic operations in finite field according to this second embodiment. This GF($2^e$) addition device 20 comprises an e bit exclusive OR (XOR) unit 20a, and operates as follows.

STEP 101: An exclusive OR value x+(XOR) y of inputs x and y are calculated by the e bit exclusive OR unit 20a.

STEP 102: An output x+(XOR) y of the e bit exclusive OR unit 20a is outputted as x+y.

Figure 8:
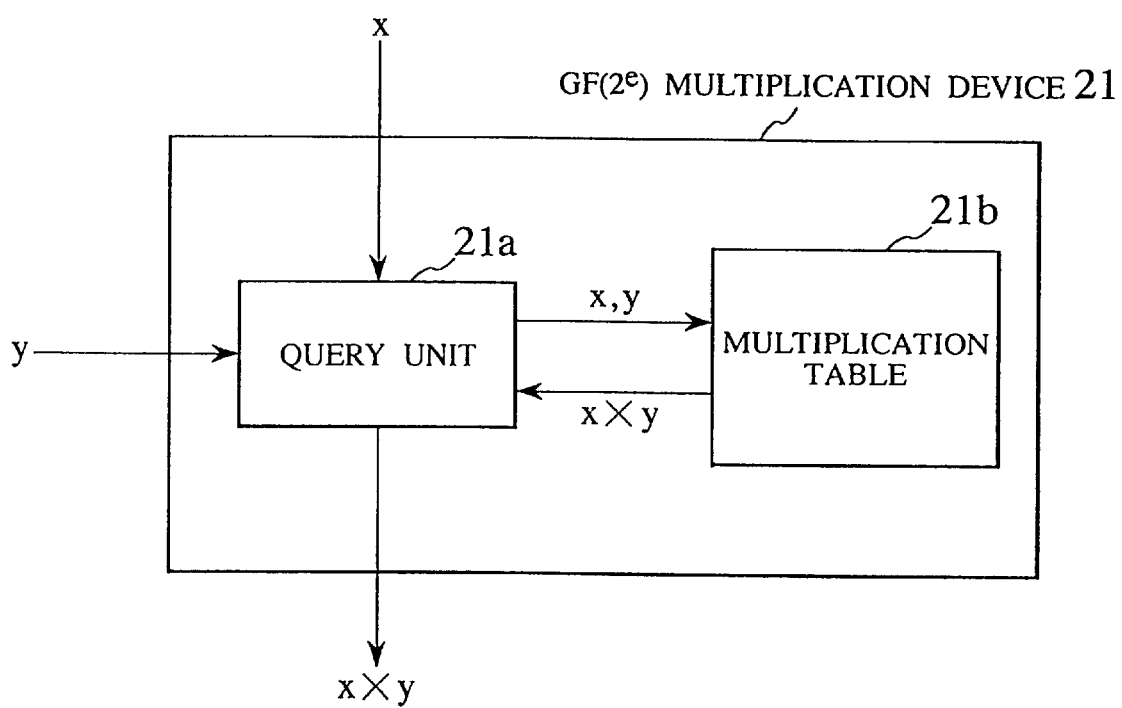
FIG. 8 is a block diagram of a $GF(2^e)$ multiplication device according to the second embodiment of the present inventing

FIG. 8 shows a configuration of a GF($2^e$) multiplication device 21 to be used for arithmetic operations in finite field according to this second embodiment. This GF($2^e$) multiplication device 21 comprises a query unit 21a and a multiplication table 21b, which are configured to operate as follows.

STEP 201: The query unit 21a looks up the multiplication table 21b by using inputs x and y as retrieval key so as to retrieve a product x×y of the inputs x and y.

STEP 202: The query unit 21a outputs a value x×y obtained from the multiplication table 21b.

As for a GF($2^e$) square calculation to be used for arithmetic operations in finite field according to this second embodiment, it can be realized by entering identifical inputs to the GF($2^e$) multiplication device 21 of FIG. 8.

Figure 9:
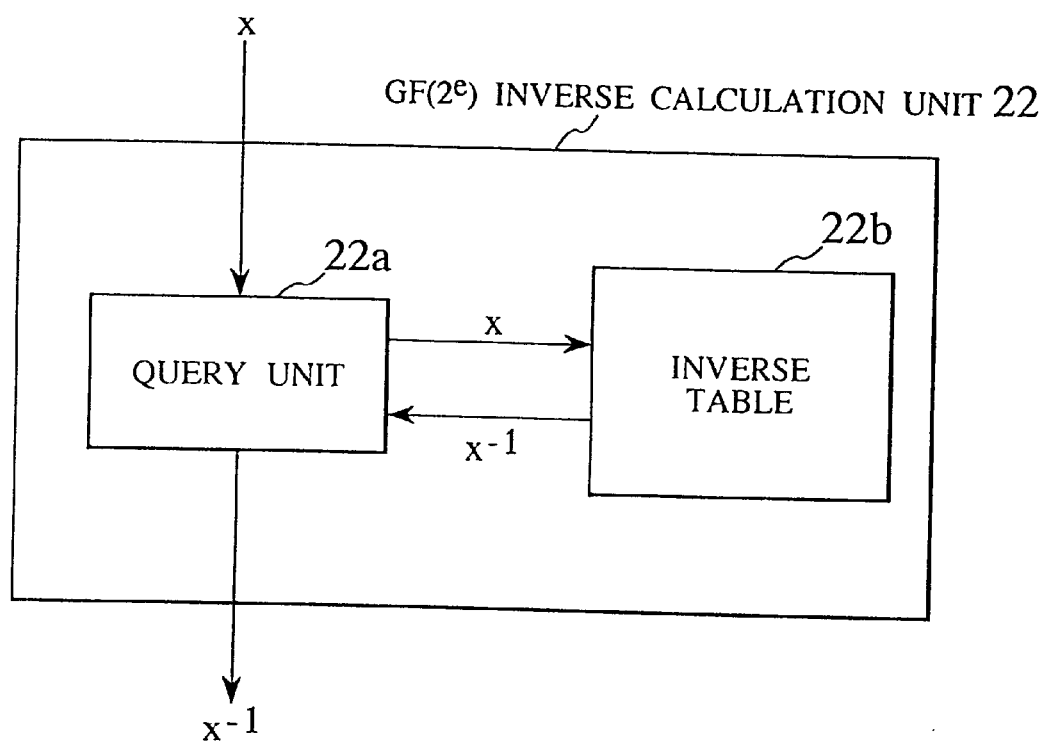
FIG. 9 is a block diagram of a $GF(2^e)$ inverse calculation device according to the second embodiment of the present invention.

FIG. 9 shows a configuration of a GF($2^e$) inverse calculation device 22 to be used for arithmetic operations in finite field according to this second embodiment. This GF($2^e$) inverse calculation device 22 comprises a query unit 22a and a query unit 22a and an inverse table 22b, which are configured to operate as follows.

STEP 301: The query unit 22a looks up the inverse table 22b by using an input x as retrieval key so as to retrieve an inverse $x^{-1}$ of the input x.

STEP 302: The query unit 22a outputs a value x-obtained from the inverse table 22b.

Figure 10:
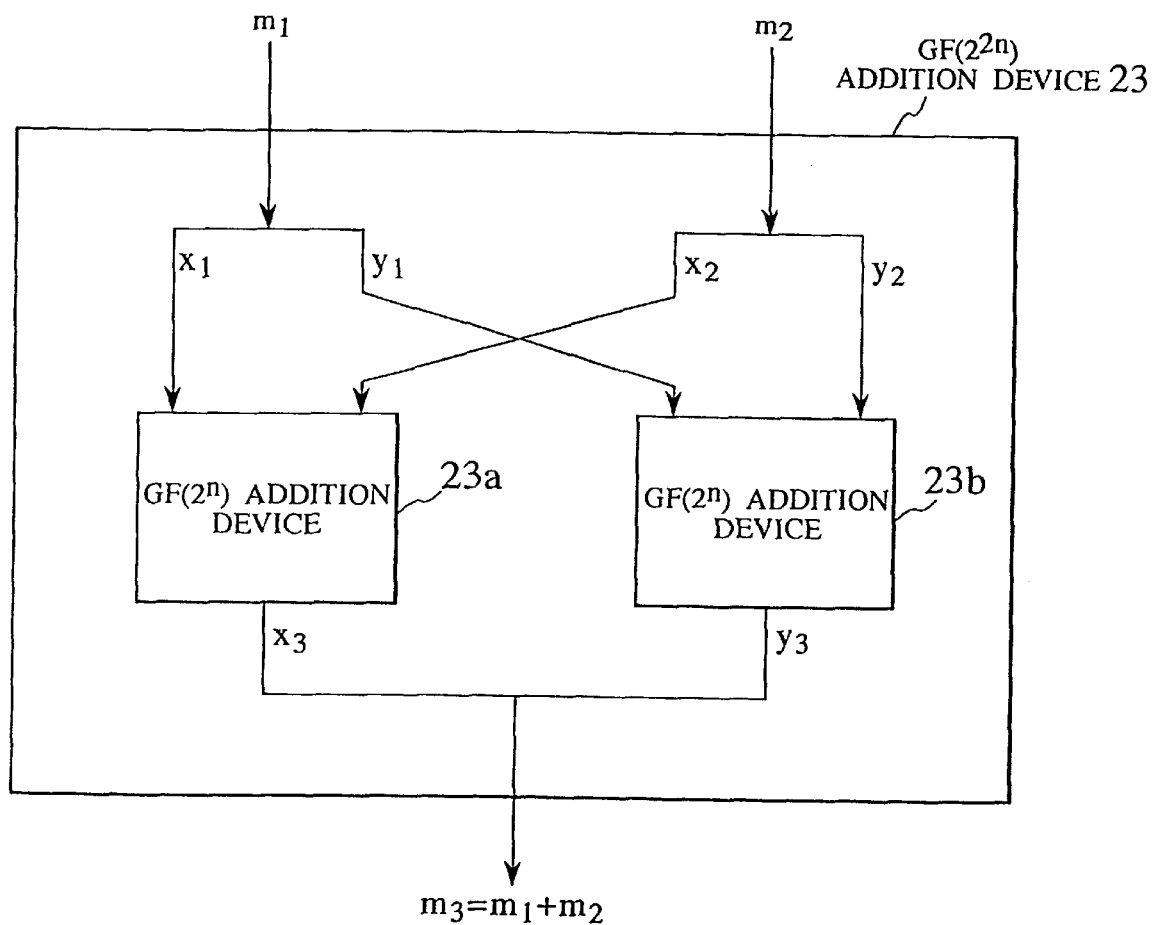
FIG. 10 is a block diagram of a $GF(2^{2n})$ addition device according to the second embodiment of the present invention.

FIG. 10 shows a configuration of a GF($2^2$ ) addition device 23 according to this second embodiment which realizes calculation of the above described equation (1). This GF($2^{2n}$) addition device 23 comprises two GF($2^n$) addition devices 23a and 23b, which are configured to operate as follows.

STEP 401: The GF($2^n$) addition device 23a calculates a sum $x_3$ of $x_1$ in one input $m_1=x_1+y_1 \alpha$ and $x_2$ in another input $m_2=x_2+y_2\alpha$.

STEP 402: The GF($2^n$) addition device 23b calculates a sum $y_3$ of $y_1$ in the input $m_1=x_1+y_1$ a and $y_2$ in the input $m_2=x_2+y_2\alpha$.

STEP 403: A set of $x_3$ and $y_3$ that gives a sum $m_3=m_1+m_2=x_3+y_3\alpha$ is outputted.

Figure 11:
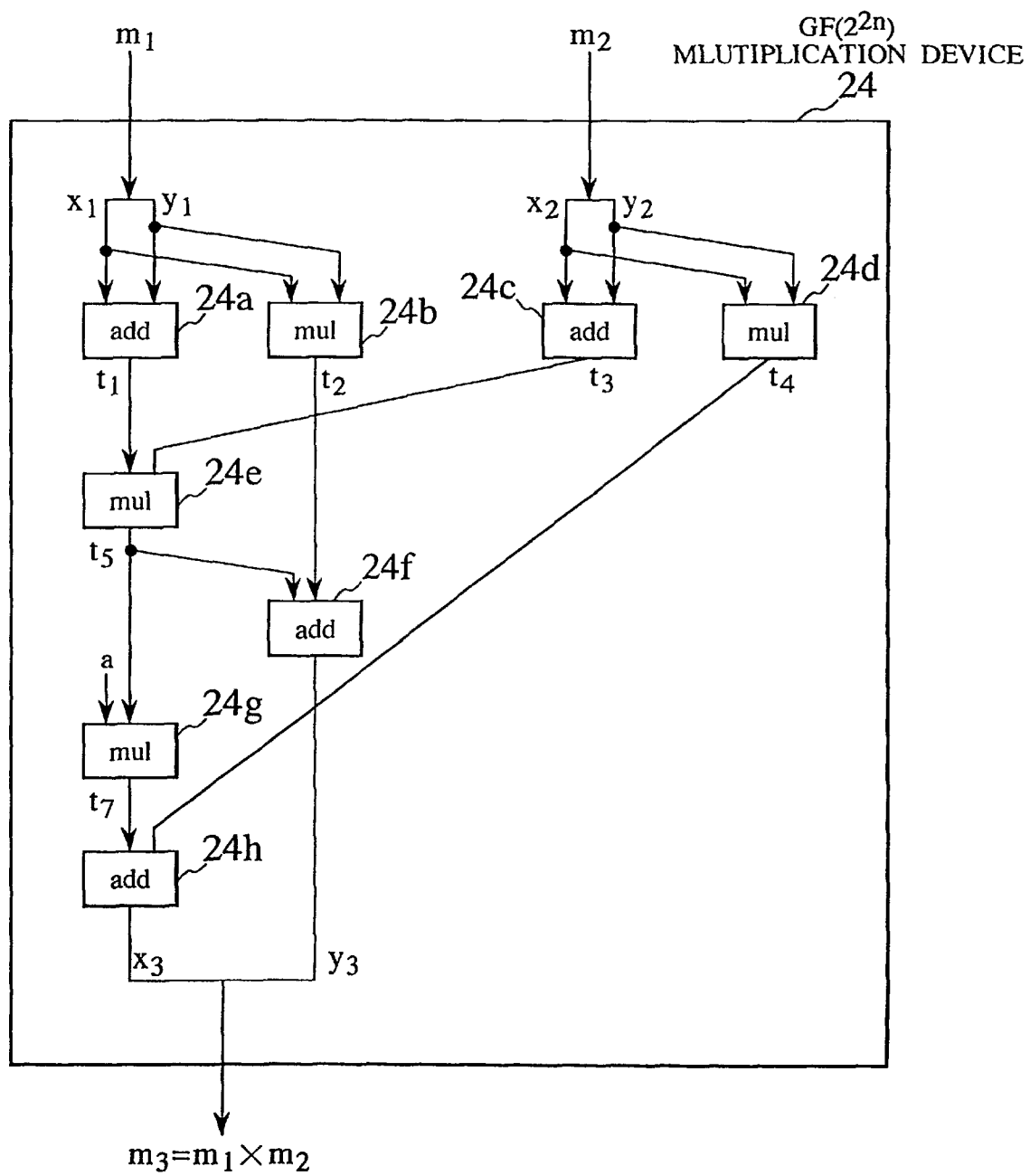
FIG. 11 is a block diagram of a $GF(2^{2n})$ multiplication device according to the second embodiment of the present invention.

FIG. 11 shows a configuration of a GF($2^{2n}$) multiplication device 24 according to this second embodiment which realizes calculation of the above described equation (2). This GF($2^{2n}$) multiplication device 24 comprises four GF($2^n$) addition devices (add) 24a, 24c, 24f and 24h and four GF($2^n$) multiplication devices (mul) 24b, 24d, 24e and 24g, which are configured to operate as follows.

STEP 501: The add device 24a calculates a sum $t_1$ of inputs $x_1$ and $y_1$, and outputs this $t_1$ to the mul device 24e.

STEP 502: The mul device 24b calculates a product $t_2$ of inputs $x_1$ and $y_1$, and outputs this $t_2$ to the add device 24f.

STEP 503: The add device 24c calculates a sum ta of inputs $x_2$ and $y_2$, and outputs this $t_3$ to the mul device 24e.

STEP 504: The mul device 24d calculates a product $t_4$ of inputs $x_2$ and $y_2$, and outputs this $t_4$ to the add device 24h.

STEP 505: The mul device 24e calculates a product $t_5$ of inputs $t_1$ and $t_3$, and outputs this $t_5$ to the add device 24f and the mul device 24g.

STEP 506: The add device 24f calculates a sum $y_3$ of inputs $t_2$ and $t_5$, and outputs this $y_3$ as part of the output of the GF($2^{2n}$) multiplication device 24.

STEP 507: The mul device 24g calculates a product $t_7$ of an input $t_5$ and a constant a, and outputs this $t_7$ to the add device 24h.

STEP 508: The add device 24h calculates a sum $x_3$ of inputs $t_4$ and $t_7$, and outputs this $x_3$ as part of the output of the GF=($2^{2n}$) multiplication device 24.

Thus the GF($2^{2n}$) multiplication device 24 outputs a set $x_3$ and $y_3$ that gives a product $m_3 = m_1 \times m_2 = x_3 + y_2\alpha$.

Figure 12:
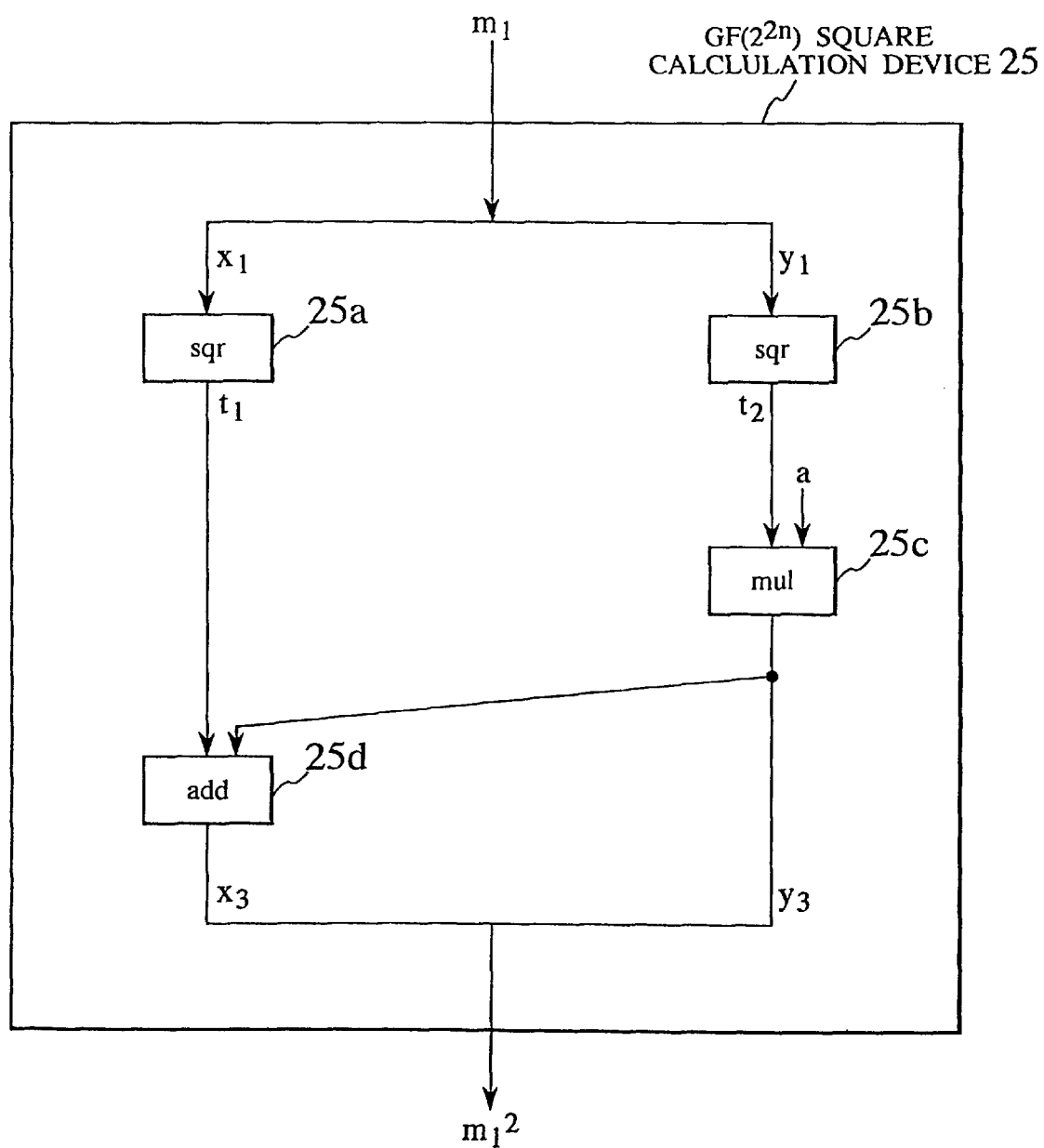
FIG. 12 is a block diagram of a $GF(2^{2n})$ square calculation device according to the second embodiment of the present invention.

FIG. 12 shows a configuration of a GF($2^{2n}$) square calculation device 25 according to this second embodiment which realizes calculation of the above described equation (3). This GF($2^{2n}$) square calculation device 25 comprises one GF($2^n$) addition device (add) 25d, one GF($2^n$) multiplication device (mul) 25c, and two GF($2^n$) square calculation devices (sqr) 25a and 25b, which are configured to operate as follows.

STEP 601: The sqr device 25a calculates a square $t_1$ of an input $x_1$, and outputs this ti to the add device 25d.

STEP 602: The sqr device 25b calculates a square $t_2$ of an input $y_1$, and outputs this $t_2$ to the mul device 25c.

STEP 603: The mul device 25c calculates a product $y_3$ of an input $t_2$ and a constant a, and outputs this $y_3$ to the add device 25d while also outputting this $y_3$ as part of the output of to the square calculation device 25.

STEP 604: The add device 25d calculates a sum $x_3$ of the inputs $t_1$ and $y_3$, and outputs this $x_3$ as part of the output of the square calculation device 25.

Thus the GF($2^{2n}$) square calculation device 25 outputs a set $x_3$ and $y_3$ that gives a square $m_1^2 = x_3 + y_3\alpha$.

Figure 13:
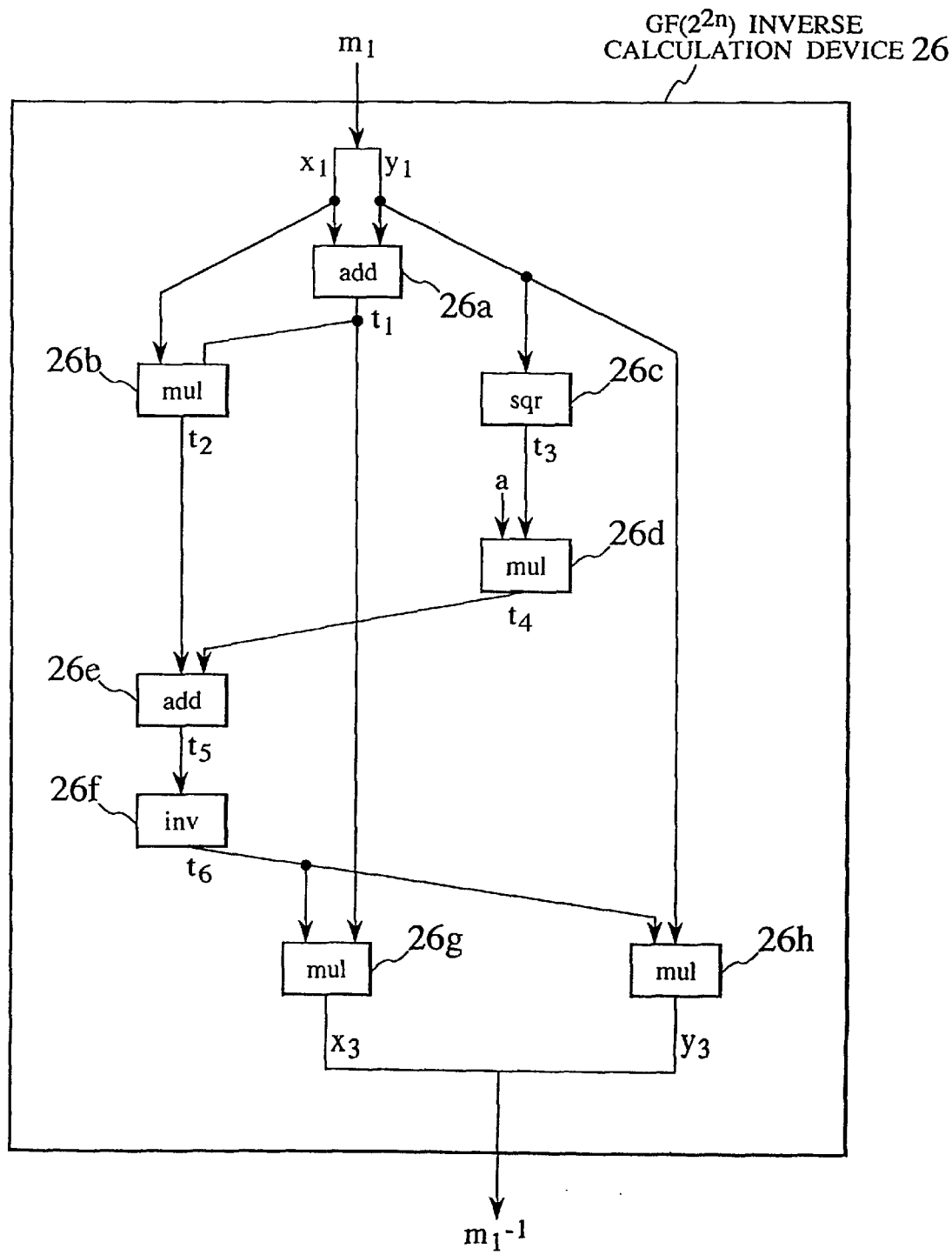
FIG. 13 is a block diagram of a $GF(2^{2n})$ inverse calculation device according to the second embodiment of the present invention.

FIG. 13 shows a configuration of a GF($2^{2n}$) inverse calculation device 26 according to this second embodiment which realizes calculation of the above described equation (4). This GF($2^{2n}$) inverse calculation device 26 comprises two GF($2^n$) addition devices (add) 26a and 26e, four GF($2^n$) multiplication devices (mul) 26b, 26d, 26g and 26h, one GF($2^n$) square calculation device (sqr) 26c, and one GF($2^n$) inverse calculation device (inv) 26f, which are configured to operate as follows.

STEP 701: The add device 26a calculates a sum $t_1$ of inputs $x_1$ and $y_1$, and outputs this $t_1$ to the mul device 26b and the mul device 26g.

STEP 702: The mul device 26b calculates a product $t_2$ of inputs $x_1$ and $t_1$, and outputs this $t_2$ to the add device 26e.

STEP 703: The sqr device 26c calculates a square $t_3$ of an input $y_1$, and outputs this $t_3$ to the mul device 26d.

STEP 704: The mul device 26d calculates a product $t_4$ of an input $t_3$ and a constant a, and outputs this $t_4$ to the add device 26e.

STEP 705: The add device 26e calculates a sum $t_5$ of inputs $t_2$ and $t_4$,1 and outputs this $t_5$ to the inv device 26f.

STEP 706: The inv device 26f calculates an inverse $t_6$ of an input $t_5$, and outputs this $t_6$ to the mul device 26g and the mul device 26h.

STEP 707: The mul device 26g calculates a product $x_3$ of inputs $t_1$ and $t_6$, and outputs this $x_3$ as part of the output of the GF($2^{2n}$) inverse calculation device 26.

STEP 708: The mul device 26h calculates a product $y_3$ of inputs $y_1$ and $t_6$, and outputs this $y_3$ as part of the output of the GF($2^{2n}$) multiplication device 24.

Thus the GF($2^{2n}$) inverse calculation device 26 outputs a set $x_3$ and $y_3$ that gives an inverse $m_1^{-1} = x_3 + y_3\alpha$.

FIG. 14 shows a comparison of finite field arithmetic operation performances by this second embodiment and the first embodiment described above.

As can be seen in FIG. 14, this second embodiment is superior to the first embodiment in terms of depth, for all the cases except for the addition. In addition, this second embodiment is superior to the first embodiment in terms of. a required number of additions for the square calculation. Since the inverse calculation internally uses the square calculation, this second embodiment can be implemented to be faster than the first embodiment for the inverse calculation as well.

It is to be noted that, when operations in finite field are to be reduced to operations in its subfield successively in a sequence of:

$$GF(2^{e2^t}) \to GF(2^{e2^{t-1}}) \to \ldots \to GF(2^e)$$

it is possible to use the scheme of the first embodiment in one reduction stage and the scheme of the second embodiment in another reduction stage. For instance, it is possible to use the scheme of the first embodiment for the reduction of operations in GF($2^{e2^t}$) to operations in GF($2^{e2^{t-1}}$), while using the scheme of the second embodiment for the reduction of operations in GF($2^{e2^{t-1}}$) to operations in GF($2^{e2^{t-2}}$), and so on so forth.

Referring now to FIG. 15 to FIG. 21, the third embodiment of a scheme for group operations over elliptic curves according to the present invention will be described in detail. This third embodiment is an application of a scheme for arithmetic operations in finite field of the first or second embodiment described above to group operations over elliptic curves in finite field.

When appropriate field K is defined, group E(K) over elliptic curves can be expressed as:

$$E(K) = \{(x, y) \in K^2 | f(x, y) = 0\} U\{0\}$$

where $f(x, y) \in K[x, y]$ (but $f(x, y)$ cannot be chosen arbitrarily and is subjected to some constraints). For $P_i = E(K)$ ($i = 1, 2, 3$), assuming that $P_3 = P_1 + P_2$ holds when $P_i \neq 0$ ($i = 1, 2, 3$), group operations over elliptic curves can be expressed in terms of appropriate polynomials $p(x_1, x_2, y_1, y_2)$, $q(x_1, x_2, y_1, y_2)$, $r(x_1, x_2, y_1, y_2)$, $s(x_1, x_2, y_1, y_2) \in K[x_1, x_2, y_1, y_2]$ as follows.

$$\begin{cases} x_3 = \dfrac{p(x_1, x_2, y_1, y_2)}{q(x_1, x_2, y_1, y_2)} \\ y_3 = \dfrac{r(x_1, x_2, y_1, y_2)}{s(x_1, x_2, y_1, y_2)} \end{cases}$$

Note here that polynomials p, q, r, s are determined and not dependent on $P_i$ when the elliptic curves E(K) are fixed, but polynomials p, q, r, s are different for a case of $P_1 = P_2$ and a case of $P_1 \neq P_2$. From the above it can be seen that group operations over elliptic curves can be constructed from arithmetic operations, in field K.

Now this third embodiment will be described in further detail with references to the drawings.

Non-supersingular elliptic curves over GF($2^{e2^t}$) can be defined in terms of parameters:

$$a_2, a_6 \in GF(2_{e2}{}^t)(a_6 \neq 0)$$

by using the affine coordinates as follows.

$$E(GF(2^{e2^t})) = \{(x, y) \in GF(2^{e2^t})^2 |$$
$$y^2 + xy = x^3 + a_2 x^2 + a_6\} U\{0\}$$

In this case, the addition over the elliptic curves is defined such that, when:

$$P_i = (x_i, y_i) \in E(GF(2^{e2^t}))(i=1, 2)$$

assuming that $-P_1 \neq P_2$, $(x_3, y_3) = P_1 + P_2$ can be given by:

When $P_1 \neq P_2$, setting $\lambda = \dfrac{y_1 + y_2}{x_1 + x_2}$, \hfill (5)

$$\begin{cases} x_3 = \lambda^2 + \lambda + (x_1 + x_2) + a_2 \\ y_3 = \lambda(x_1 + x_3) + x_3 + y_1 \end{cases}$$

When $P_1 = P_2$, setting $\lambda = x_1 + \dfrac{y_1}{x_1}$ \hfill (6)

$$\begin{cases} x_3 = \lambda^2 + \lambda + a_2 \\ y_3 = (\lambda + 1)x_3 + x_1^2 \end{cases}$$

Also, the inverse over the elliptic curves can be expressed as follows.

$$-(x_1, y_1) = (x_1, x_1 + y_1) \quad (7)$$

(For details of group operations over elliptic curves in field with characteristic 2, see A. J. Menezes: "Elliptic Curve Public Key Cryptosystems", Kluwer Academic Publishers, pp. 21–23, 1993, for example.)

An element in finite field $GF(2^{e2^t})$ can be expressed by a bit sequence in $e2^t$ digits, and a point on an elliptic curve can be expressed by two elements in finite field, so that a point on an elliptic curve can be expressed by a bit sequence in $2e2^t$ bits. In the following, a point $P_i$ on an elliptic curve is assumed to be expressed in this way. Note however that $0 \in E(GF(2^{e2^t}))$ can be expressed as $0 = (0, 0)$ because:

$$(0, 0) \notin E(GF(2^{e2^t}))$$

Figure 15:
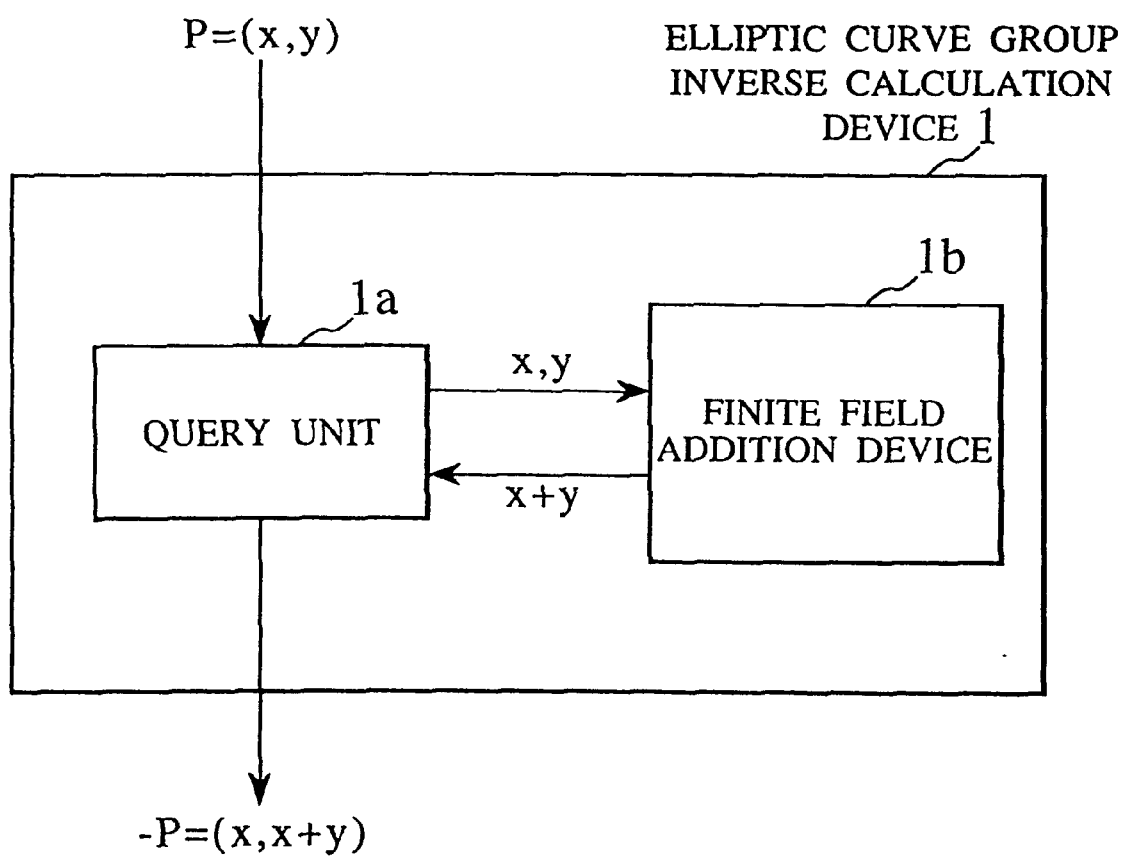
FIG. 15 is a block diagram of an elliptic curve group inverse calculation device according to the third embodiment of the present invention.

FIG. 15 shows a configuration of an elliptic curve group inverse calculation device 1 for an element of a group over elliptic curves according to this third embodiment which realizes calculation of the above equation (7). This elliptic curve group inverse calculation device 1 comprises a query unit 1a and a finite field addition device 1b such as that shown in FIG. 10 described above, which are configured to operate as follows.

STEP 801: The query unit 1a gives input (x, y) to the finite field addition device 1b.

STEP 802: The finite field addition device 1b calculates a sum x+y in $GF(2^{e2^t})$ of the input x and y, and returns it to the query unit 1a.

STEP 803: The query unit 1a outputs an inverse (x, x+y) of an element of a group over elliptic curves by using x+y obtained from the finite field addition device 1b.

Figure 16:
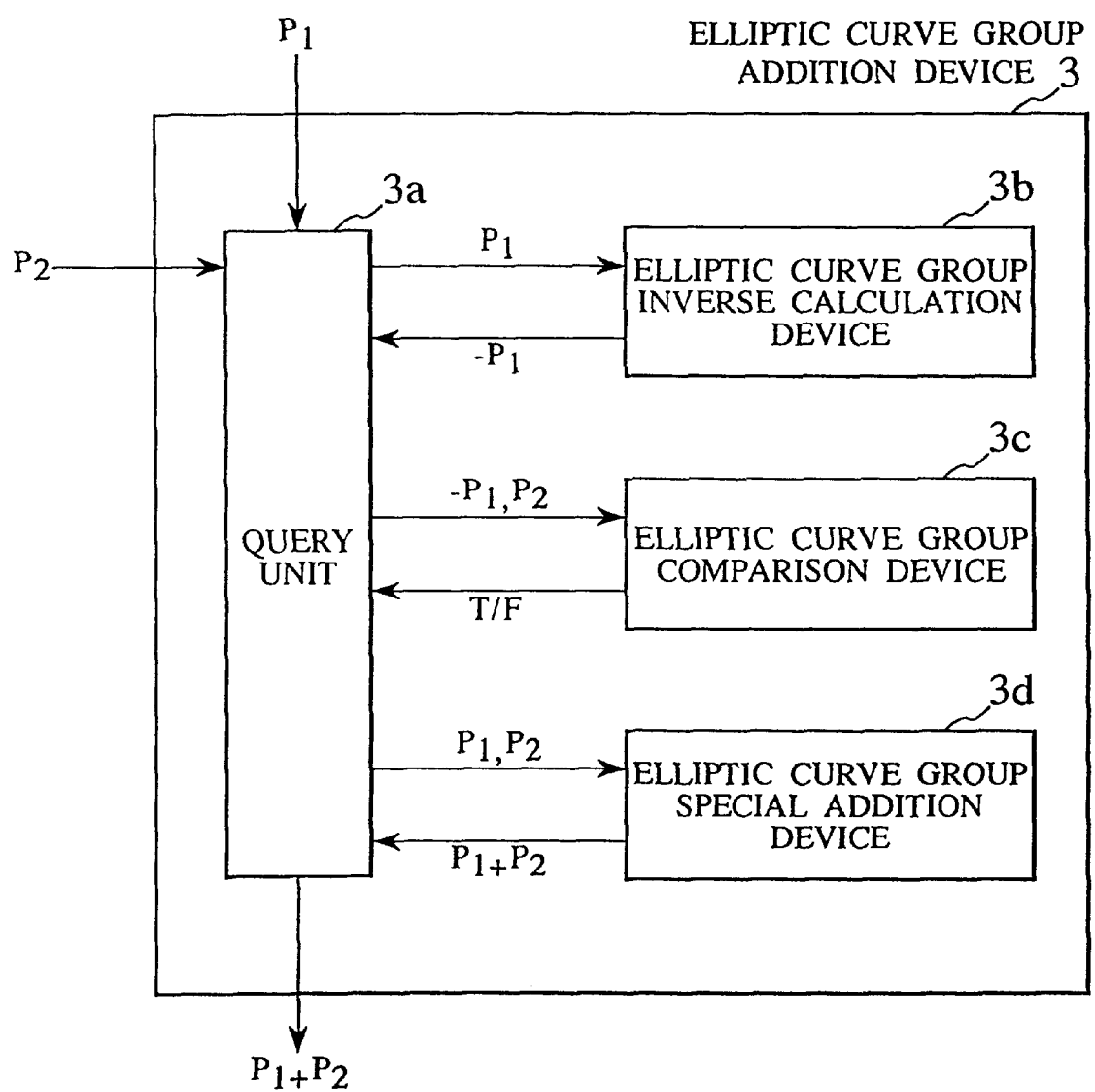
FIG. 16 is a block diagram of an elliptic curve group addition device according to the third embodiment of the present invention.

FIG. 16 shows an elliptic curve group addition device 3 for elements of a group over elliptic curves according to this third embodiment which realizes calculation of the above equation (5). This elliptic curve group addition device 3 comprises a query unit 3a, an elliptic curve group inverse calculation device 3b for an element of a group over elliptic curves such as that shown in FIG. 15 described above, an elliptic curve group comparison device 3c for elements of a group over elliptic curves such as that of FIG. 17 to be described below, and an elliptic curve group special addition device 3d for elements of a group over elliptic curves such as that of FIG. 18 to be described below, which are configured to operate as follows.

STEP 901: The query unit 3a checks whether $P_1 = 0$ or not by using the elliptic curve group comparison device 3c, and if it is TRUE, the query unit 3a sets $Q = P_2$ and proceeds to the step 908.

STEP 902: The query unit 3a checks whether $P_2 = 0$ or not by using the elliptic curve group comparison device 3c, and if it is TRUE, the query unit 3a sets $Q = P_1$ and proceeds to the step 908.

STEP 903: The query unit 3a gives an input $P_1$ to the elliptic curve group inverse calculation device 3b.

STEP 904: The elliptic curve group inverse calculation device 3b calculates an inverse $-P_1$ of the input $P_1$, and returns it to the query unit 3a.

STEP 905: The query unit 3a gives the output $-P_1$ of the elliptic curve group inverse calculation device 3b and its own input $P_2$ to the elliptic curve group comparison device 3c.

STEP 906: The elliptic curve group comparison device 3c compares inputs $-P_1$ and $P_2$, and returns T (TRUE) when they coincide or F (FALSE) otherwise.

STEP 907: The query unit 3a sets $Q = 0$ when the output of the elliptic curve group comparison device 3c at the step 906 is T (TRUE), or obtains $Q = P_1 + P_2$ by giving Pi and $P_2$ to the elliptic curve group special addition device 3d otherwise.

STEP 908: The query unit 3a outputs Q ($= P_1 + P_2$).

Figure 17:
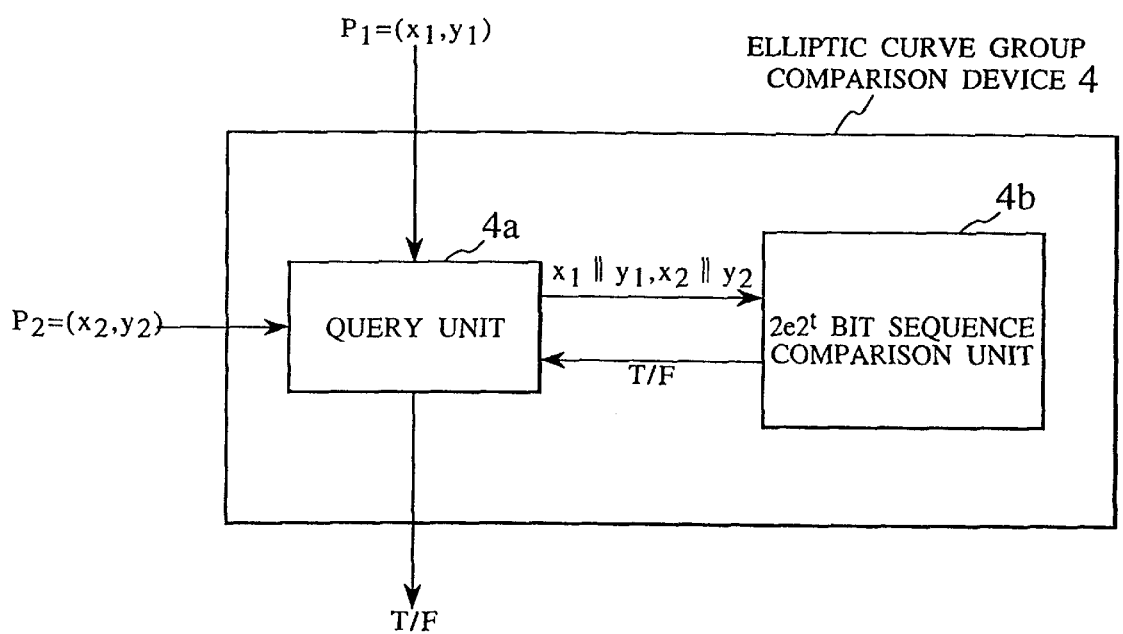
FIG. 17 is a block diagram of an elliptic curve group comparison device according to the third embodiment of the present invention.

FIG. 17 shows an elliptic curve group comparison device 4 for elements of a group over elliptic curves according to this third embodiment which can be used in the elliptic curve group addition device of FIG. 16 described above. This elliptic curve group comparison device 4 comprises a query unit 4a and a $2e2^t$ bit sequence comparison unit 4b, which are configured to operate as follows.

STEP 1001: The query unit 4a gives bit sequences $x_1 \| y_1$ and $x_2 \| y_2$ obtained by Joining bit sequences $x_1$ and $y_1$ of an input $P_1 = (x_1, y_1)$ and bit sequences $x_2$ and $y_2$ of an input $P_2 = (x_2, y_2)$, respectively, to $2e2^t$ bit sequence comparison unit 4b.

STEP 1002: The $2e2^t$ bit sequence comparison unit 4b compares $x_1 \| y_1$ and $x_2 \| y_2$, and returns T (TRUE) when they coincide or F (FALSE) otherwise.

STEP 1003: The query unit 4a outputs T/F value obtained by the $2e2^t$ bit sequence comparison unit 4b.

Figure 18:
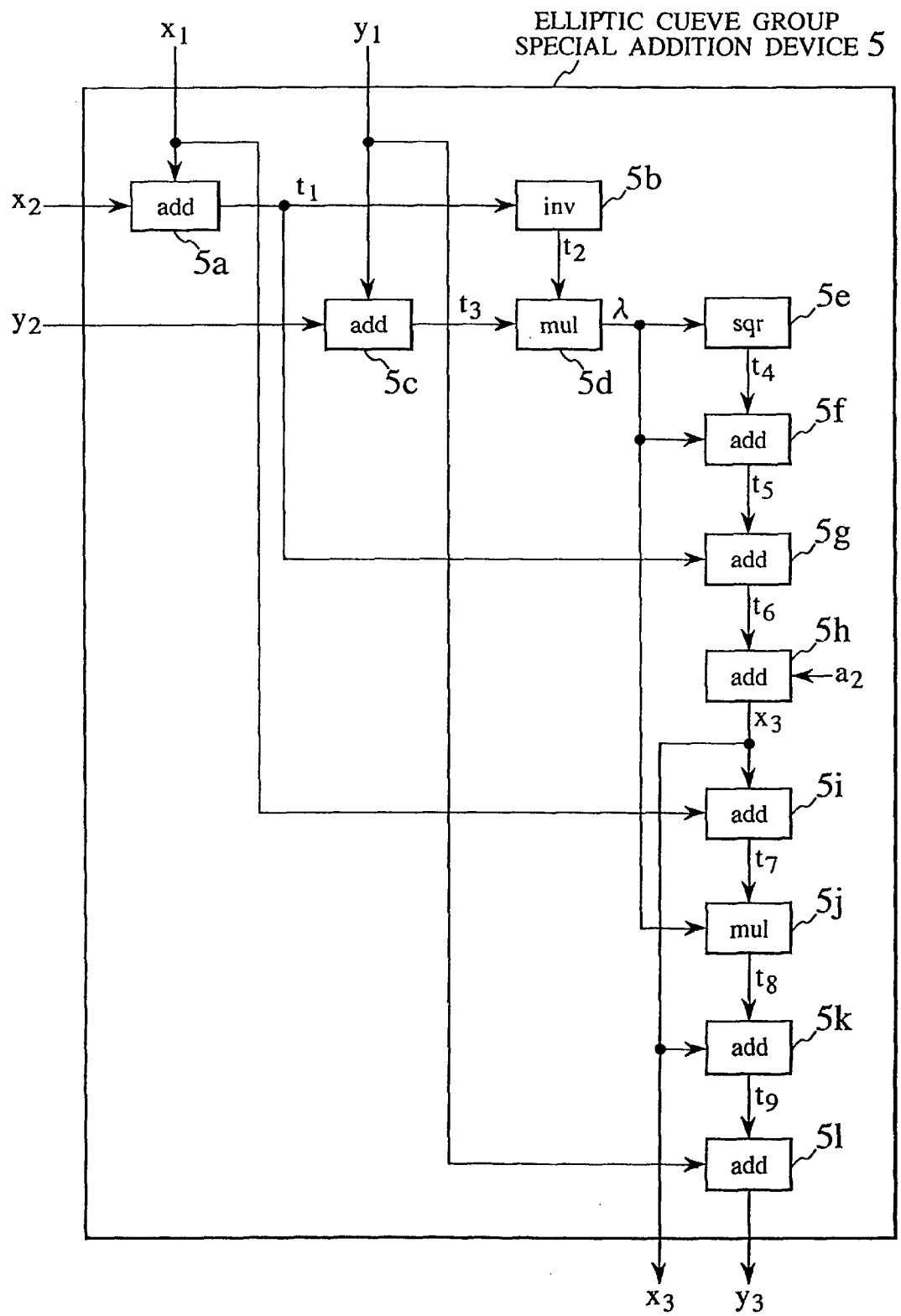
FIG. 18 is a block diagram of an elliptic curve group special addition device according to the third embodiment of the present invention.

FIG. 18 shows an elliptic curve group special addition device 5 for elements of a group over elliptic curves according to this third embodiment which can be used in the elliptic curve group addition device of FIG. 16 described above. This elliptic curve group special addition device 5 comprises eight finite field addition devices (add) 5a, 5c, 5f, 5g, 5h, 5i, 5k and 5l, one finite field inverse calculation device 5b, two finite field multiplication devices (mul) 5d and 5j, and one finite field square calculation device (sqr) 5e, which are configured to operate as follows.

STEP 1101: The add device 5a calculates a sum $t_1 (= x_1 + x_2)$ of inputs $x_1$ and $x_2$, and outputs this $t_1$ to the inv device 5b and the add device 5g.

STEP 1102: The inv device 5b calculates an inverse $t_2 (= (x_1 + x_2)^{-1})$ of an input $t_1$, and outputs this $t_2$ to the mul device 5d.

STEP 1103: The add device 5c calculates a sum $t_3 (= y_1 + y_2)$ of inputs $y_1$ and $y_2$, and outputs this $t_3$ to the mul device 5d.

STEP 1104: The mul device 5d calculates a product:

$$\lambda \left( = \dfrac{y_1 + y_2}{x_1 + x_2} \right)$$

of inputs $t_2$ and $t_3$, and outputs this X to the sqr device 5e, the add device 5f, and the mul device 5j.

STEP 1105: The sqr device 5e calculates a square $t_4 (= \lambda^2)$ of an input $\lambda$, and outputs this $t_4$ to the add device 5f.

STEP 1106: The add device 5f calculates a sum $t_5$ (=$\lambda^2+\lambda$) of inputs $\lambda$ and $t_4$, and outputs this $t_5$ to the add device 5g.

STEP 1107: The add device 5g calculates a sum $t_6$ (=$\lambda^2+x+x_1+x_2$) of inputs $t_1$ and $t_5$, and outputs this $t_6$ to the add device 5h.

STEP 1108: The add device 5h calculates a sum $x_3$ (=$\lambda^2+\lambda+x_1+x_2+a_2$) of an input $t_6$ and a constant $a_2$, and outputs this $x_3$ to the add device 5i and the add device 5k while also outputting this $x_3$ as part of the output of the elliptic curve group special addition device 5.

STEP 1109: The add device 5i calculates a sum $t_7$ (=$x+x_3$) of inputs $x_1$ and $x_3$, and outputs this $t_7$ to the mul device 5j.

STEP 1110: The mul device 5j calculates a product $t_8$ (=$\lambda(x_1+x_3)$) of inputs $\lambda$ and $t_7$, and outputs this $t_8$ to the add device 5k.

STEP 1111: The add device 5k calculates a sum $t_9$ (=$\lambda(x_1+x_3)+x_3$) of inputs $t_8$ and $x_3$, and outputs this $t_9$ to the add device 5l.

STEP 1112: The add device 5l calculates a sum $y_3$ (=$\lambda(x_1+x_3)+x_3+y_1$) of inputs $y_1$ and $t_9$, and outputs this $y_3$ as part of the output of the elliptic curve group special addition device 5.

Note that each finite field multiplication device (mul) used in this elliptic curve group special addition device 5 can have a configuration as shown in FIG. 11 described above. The finite field square calculation device (sqr) used in this elliptic curve group special addition device 5 can be realized by a configuration of FIG. 11 described above, but can be realized in faster implementation by a special configuration for square calculation such as that of FIG. 12 described above. The finite field inverse calculation device (inv) used in this elliptic curve group special addition device 5 can have a configuration as shown in FIG. 13 described above.

Figure 19:
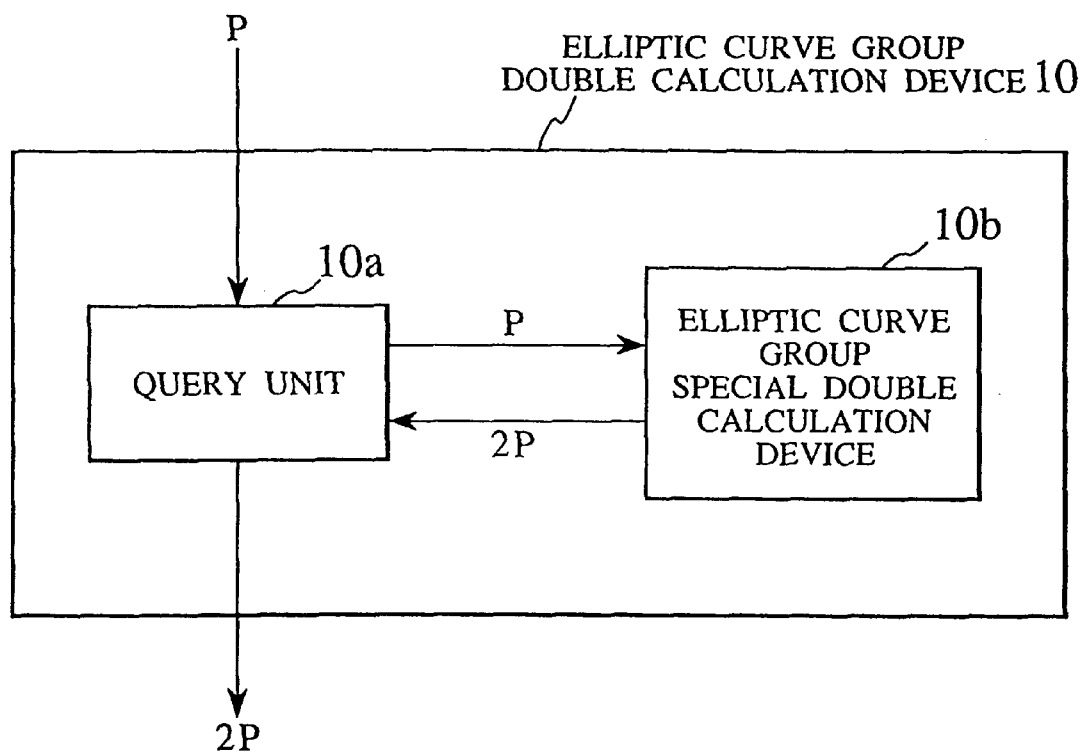
FIG. 19 is a block diagram of an elliptic curve group double calculation device according to the third embodiment of the present invention.

FIG. 19 shows an elliptic curve group double calculation device 10 for an element of a group over elliptic curves according to this third embodiment which realizes calculation of the above equation (6). This elliptic curve group double calculation device 10 comprises a query unit 10a and an elluiptic curve group special double calculation device 10b for an element of a group over elliptic curves such as that of FIG. 20 to be described below, which are configured to operate as follows.

STEP 1201: The query unit 10a sets Q=0 when x=0 in an input P=(x, y), or obtains Q=2P by giving the input P to the elliptic curve group special double calculation device 10b otherwise.

STEP 1202: The query unit 10a outputs Q (=2P).

Figure 20:
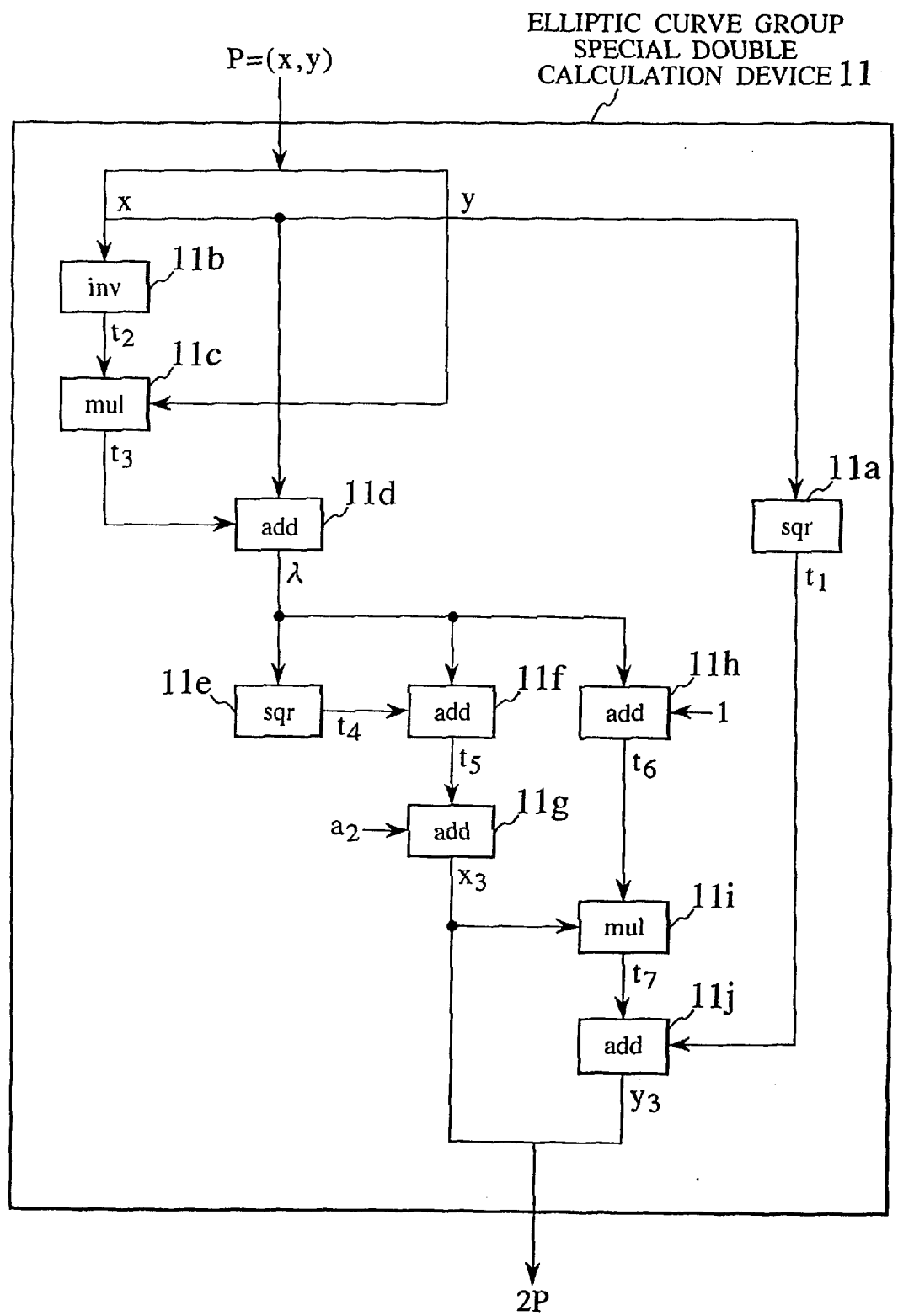
FIG. 20 is a block diagram of an elliptic curve group special double calculation device according to the third embodiment of the present invention.

FIG. 20 shows an elliptic curve group special double calculation device 11 for an element of a group over elliptic curves according to this third embodiment which can be used in the elliptic curve group double calculation device of FIG. 19 described above. This elliptic curve group special double calculation device 11 comprises five finite field addition devices (add) 11d, 11f, 11g, 11h and 11j, one finite field inverse calculation device 11b, two finite field multiplication devices (mul) 11c and 11i, and two finite field square calculation devices (sqr) 11a and 11e, which are configured to operate as follows.

STEP 1301: The sqr device hla calculates a square $t_1$ (=$x^2$) of an input x, and outputs this $t_1$ to the add device 11j.

STEP 1302: The inv device 11b calculates an inverse ts (=$x^{-1}$) of the input x, and outputs this $t_2$ to the mul device 11c.

STEP 1303: The mul device 11c calculates a product $t_2$ (=$x^{-1} \times y$) of inputs y and $t_2$, and outputs this $t_3$ to the add device 11d.

STEP 1304: The add device 11d calculates a sum:

$$\lambda \left( = x + \frac{y}{x} \right)$$

of inputs x and $y_3$, and outputs this $\lambda$ to the sqr device 11e, the add device 11f and the add device 11h.

STEP 1305: The sqr device 11e calculates a square $t_4$ (=$\lambda^2$) of an input $\lambda$, and outputs this $t_4$ to the add device 11f.

STEP 1306: The add device 11f calculates a sum $t_5$ (=$\lambda^2+\lambda$) of inputs $\lambda$ and $t_4$, and outputs-this $t_5$ to the add device 11g.

STEP 1307: The add device 11g calculates a sum $x_2$(= $\lambda^2+\lambda+a_2$) of an input $t_5$ and a constant $a_2$, and outputs this $x_3$ as part of the output of the elliptic curve group special double calculation device 11.

STEP 1308: The add device 11h calculates a sum $t_6$ (=$\lambda+1$) of an input $\lambda$ and a constant 1, and outputs this $t_6$ to the mul device 11i.

STEP 1309: The mul device 11 calculates a product $t_7$ (=$(\lambda+1)x_3$) of inputs $x_3$ and $t_6$, and outputs this $t_7$ to the add device 11j.

STEP 1310: The add device 11j calculates a sum $y_3$ (=$(\lambda+1)x_3+x_1^2$) of inputs $t_1$ and $t_7$, and outputs this $y_3$ as part of the output of the elliptic curve group special double calculation device 11.

Figure 21:
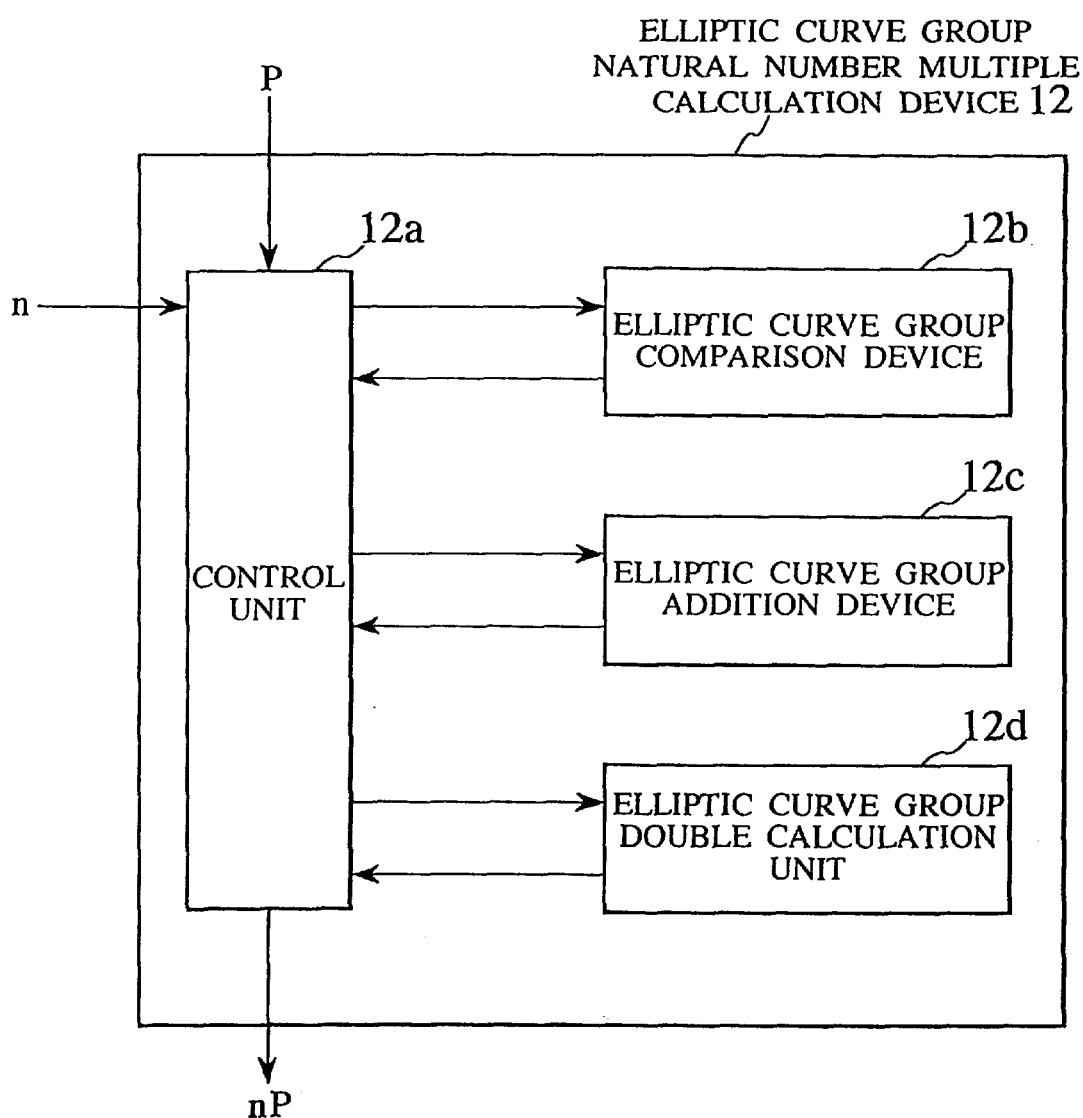
FIG. 21 is a block diagram of an elliptic curve group natural number multiple calculation device according to the third embodiment of the present invention.

FIG. 21 shows an elliptic curve group natural number multiple calculation device 12 for an element of a group over elliptic curves according to this third embodiment. A natural number multiple of an element of a group over elliptic curves can be realized in various ways, and FIG. 21 shows an implementation using a binary calculation method (see B. Schneier, Applied Cryptography, 2nd Edition, pp. 242–244). This elliptic curve group natural number multiple calculation device 12 comprises a control unit 12a, an elliptic curve group comparison device 12b for elements of a group over elliptic curves such as that shown in FIG. 17 described above, an elliptic curve group addition device 12c for elements of a group over elliptic curves such as that shown in FIG. 16 described above, and an elliptic curve group double calculation device 12d for an element of a group over elliptic curves such as that shown in FIG. 19 described above, which are configured to operate as follows.

STEP 1401: The control unit 12a initializes internal variables Q and R as follows.

$Q=0$ $R=P$

STEP 1402: The control unit 12a checks a value of n, and outputs Q as the output of the elliptic curve group natural number multiple calculation device 12 and then stops operating when n coincides with 0.

STEP 1403: The control unit 12a checks a value of n, and sets:

$n \leftarrow n-1$ when n is odd. Then, control unit 12a compares values of Q and R by using the elliptic curve group comparison device 12b, and calculates:

$$Q \leftarrow Q+R$$

by using the elliptic curve group double calculation device 12d when Q and R coincide, or by using the elliptic curve group addition device 12c when Q and R do not coincide.

STEP 1404: The control unit 12a calculates:

$$n \leftarrow n/2$$

STEP 1405: The control unit 12a calculates:

$$R \leftarrow 2R$$

by using the elliptic curve group double calculation device 12d.

STEP 1406: The control unit 12a returns the operation back to the step 1402 described above.

Now, this scheme for group operations over elliptic curves according to the third embodiment can be applied to various fields such as those of cipher communications and electronic money. Here, the key sharing, encryption, and digital signing in a case of applying this third embodiment to the fields of cipher communications and electronic money will be described.

First, the Diffie-Hellman key sharing scheme using elliptic curves will be described. Here, system parameters are assumed to be an elliptic curve $E(GF(2^n))$ and an element $P \in E(GF(2^n))$ of large order.

In this case, at a time of key generation, a user U randomly generates a positive integer xu and calculates:

$$Y_U = x_U P$$

where $x_U$ is a secret key and $Y_U$ is a public key.

Next, the key sharing between users A and B can be realized as follows.

STEP 1501: The user A acquires the public key $Y_B$ of the user B somehow.

STEP 1502: The user A calculates:

$$K_{A,B} = x_A Y_B$$

STEP 1503: The user B similarly calculates:

As a result, the key $K_{A,B} = K_{B,A}$ is shared between the users A and B.

By applying the scheme for group operations over elliptic curves of the third embodiment to this procedure it becomes possible to realize the faster processing speed.

Next, the ElGamal encryption using elliptic curves will be described. Here, system parameters are assumed to be an elliptic curve $E(GF(2^n))$ and an element $P \in E(GF(2^n))$ of large order.

In this case, at a time of key generation, a user U randomly generates a positive integer $x_U$ and calculates:

$$Y_U = x_U P$$

where $x_U$ is a secret key and $Y_U$ is a public key.

Next, a sender can encrypt a plaintext M and transmits a resulting ciphertext to a receiver user A as follows.

STEP 1601: The sender acquires the public key $Y_A$ of the user A somehow.

STEP 1602: The sender generates a positive integer random number r.

STEP 1603: The sender calculates the ciphertext $(C_1, C_2)$ as follows.

$$C_1 = rP$$

$$C_2 = M + rY_A$$

STEP 1604: The user A can obtain the plaintext M by carrying out the decryption of the ciphertext $(C_1, C_2)$ as follows.

$$M = C_2 - x_A C_1$$

Next, the ElGamal digital signature using elliptic curves will be described. Here, system parameters are assumed to be an elliptic curve $E(GF(2^n))$, an element $P \in E(GF(2^n))$ of large order, and an order $^\#E(GF(2^n))$ of the elliptic curve, and a one-way hash function h is to be used.

In this case, at a time of key generation, a user U randomly generates a positive integer $x_U$ and calculates:

$$Y_U = x_U P$$

where $x_U$ is a secret key and $Y_U$ is a public key.

Next, a user A can digitally sign data m as follows.

STEP 1701: The user A randomly selects a positive integer k which is relatively prime with respect to $^\#E(GF(2^n))$.

STEP 1702: The user A calculates the signature (R, s) as follows.

$$R = kP$$

$$s = (m - x_A h(r)) k^{-1} \bmod {}^\#E(GF(2^n))$$

Then, the authenticity of this signature (R, s) can be verified as follows.

$$mP = h(R) Y_A + R$$

It is to be noted that, according to this scheme of the third embodiment, when elements other than a point at infinity 0 of a group over elliptic curves $E(GF(2^{2n}))$ in finite field $GF(2^{2n})$ are expressed in terms of affine coordinates (x, y), group operations over elliptic curves can be expressed as rational expressions in x and y, and it is possible to calculate a rational expression in a form of:

$$\frac{p(X_1, X_2, \cdots, X_r)}{q(X_1, X_2, \cdots, X_r)}$$

where p, $q \in GF(2^{2n})([X_1, X_2, \ldots, Xr]$
by calculating a multiplication in $GF(2^{2n})$ that arises in calculations using polynomials p, $q \in GF(2^{2n})[X_1, X_2, Xr]$ according to:

$$(x_1 + y_1 \alpha) \times (x_2 + y_2 \alpha)$$

$$= (x_1 x_2 + a y_1 y_2 + ((x_1 + y_1)(x_2 + y_2) + x_1 x_2) \alpha$$

and $$(x_1 + y_1 \alpha)^2 = (x_1^2 + a y_1^2) + y_1^2 \alpha$$

where $x_1$, $x_2$, $y_1$, $y_2$, $a \in GF(2^n)$, $\alpha \in GF(2^n)$, $\alpha^2 + \alpha + a = 0$ and $GF(2^{2n}) = GF(2^n)(\alpha)$;
and calculating an inverse $q^{-1}$ of q in $GF(2^{2n})$ according to:

$$(x_i + y_1 \alpha)^{-1} = (x_1(x_1 + y_1) + a y_1^2)^{-1}((x_1 + y_1) + y_1 \alpha)$$

where $x_1$, $y_1$, $a \in GF(2^n)$, $\alpha \notin GF(2^n)$, $\alpha^2 + \alpha + a = 0$ and $GF(2^{2n}) = GF(2^n)(\alpha)$;
and then calculating $p \times q^{-1}$ by repeating the multiplication as described above for calculations using polynomials p and q.

It is to be noted that the above described embodiments according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art.

In particular, any of the devices shown in FIG. 1 to FIG. 13 and FIG. 15 to FIG. 21 described above can be conveniently implemented in forms of software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMS, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for calculating a square in finite field $GF(2^{2n})$, comprising the steps of:

expressing an element $m \in GF(2^{2n}) \cong GF(2^n)[x]/(x^2+x+a)$ as $$m = x + y\alpha \ (x, y \in GF(2^n))$$

where $\alpha \notin GF(2^n)$, $\alpha^2 + \alpha + a = 0$, and $a \in GF(2^n)$ so that a square $m^2$ of the element m in the finite field $GF(2^{2n})$ is expressed as a combination of multiplications and additions in subfield $GF(2^n)$ given by $$m^2 = (x^2 + ay^2) + y^2 \alpha$$

by using a standard basis $[1 \ \alpha]$; and calculating the square $m^2$ of the element m in the finite field $GF(2^{2n})$ by executing said combination of multiplications and additions in the subfield $GF(2^n)$.

2. A device for calculating a square in finite field $GF(2^{2n})$, comprising:

an input unit for expressing an element $m \in GF(2^{2n}) \cong GF(2^{2n})[x]/(x^2+x+a)$ as $$m = x + y\alpha \ (x, y \in GF(2^n))$$

where $\alpha \notin GF(2^n)$, $\alpha^2 + \alpha + a = 0$, and $a \in GF(2^n)$ so that a square $m^2$ of the element m in the finite field $GF(2^{2n})$ is expressed as a combination of multiplications and additions in subfield $GF(2^n)$ given by $$m^2(x^2 + ay^2) + y^2 \alpha$$

by using a standard basis $[1 \ \alpha]$; and a calculation unit for calculating the square $m^2$ of the element m in the finite field $GF(2^{2n})$ by executing said combination of multiplications and additions in the subfield $GF(2^n)$.

3. An article of manufacture, comprising:

a computer usable medium having computer readable program code means embodied therein for causing a computer to function as a system for calculating a square in finite field $GF(2^{2n})$, the computer readable program code means includes:

first computer readable program code means for causing said computer to express an element $m \in GF(2^{2n})$ $GF(2^n)[x]/(x^2+x+a)$ as $$m = x + y\alpha \ (x, y \in GF(2^n))$$

where $\alpha \in GF(2^n)$, $\alpha^2 + \alpha + a = 0$, and $a \in GF(2^n)$ so that a square $m^2$ of the element m in the finite field $GF(2^{2n})$ is expressed as a combination of multiplications and additions in subfield $GF(2^n)$ given by $$m^2 = (x^2 + ay^2) + y^2 \alpha$$

by using a standard basis $[1 \ \alpha]$; and second computer readable program code means for causing said computer to calculate the square $m^2$ of the element m in the finite field $GF(2^{2n})$ by executing said combination of multiplications and additions in the subfield $GF(2^n)$.

* * * * *